(12) United States Patent
Lilienthal

(10) Patent No.: US 9,424,307 B2
(45) Date of Patent: Aug. 23, 2016

(54) MULTIVARIATE DATA ANALYSIS METHOD

(71) Applicant: Scott E. Lilienthal, Laurel, MD (US)

(72) Inventor: Scott E. Lilienthal, Laurel, MD (US)

( * ) Notice: Subject to any disclaimer, the term of this patent is extended or adjusted under 35 U.S.C. 154(b) by 238 days.

(21) Appl. No.: 14/052,288

(22) Filed: Oct. 11, 2013

(65) Prior Publication Data

US 2014/0136557 A1    May 15, 2014

Related U.S. Application Data

(60) Provisional application No. 61/795,127, filed on Oct. 11, 2012.

(51) Int. Cl.
  *G06F 17/30* (2006.01)
  *G06F 17/15* (2006.01)

(52) U.S. Cl.
  CPC ........ *G06F 17/30424* (2013.01); *G06F 17/153* (2013.01)

(58) Field of Classification Search
  CPC .......................................... G06F 17/15–17/16
  See application file for complete search history.

(56) References Cited

U.S. PATENT DOCUMENTS

| | | | | |
|---|---|---|---|---|
| 6,223,192 B1* | 4/2001 | Oberman | ................... | G06F 7/53 708/270 |
| 6,256,653 B1* | 7/2001 | Juffa | ....................... | G06F 7/483 708/290 |
| 6,473,080 B1* | 10/2002 | Brown | ..................... | G06F 17/17 345/419 |
| 8,473,474 B1* | 6/2013 | Eisenreich | ............. | G06N 7/005 705/35 |
| 2004/0204905 A1* | 10/2004 | Huelsbergen | ......... | G06F 17/509 702/179 |

OTHER PUBLICATIONS

B. Shaw, B. Huang, and T. Jebara. Learning a distance metric from a network. Neural Information Processing Systems (NIPS); 2011.
Washio, Takashi and Hiroshi Motoda, State of the Art of Graph-based Data Mining, SIGKDD Explorations. 5:59-68; 2003.
Michailidis, George and De Leeuw, Jan, Data Visualization Through Graph Drawing, Comput. Statist., vol. 16, pp. 435-450; 2001.

\* cited by examiner

*Primary Examiner* — Robert Beausoliel, Jr.
*Assistant Examiner* — Nirav K Khakhar
(74) *Attorney, Agent, or Firm* — Ober, Kaler, Grimes and Shriver; Royal W. Craig

(57) ABSTRACT

This invention is a computerized method which unites a multivariate dataset and then performs various operations, including data analytics. The set is stored in a "bipartite synthesis matrix" (BSM), e.g., a rectangular matrix with rows of data objects and columns of variable attributes, defined by a plurality of partitions (each with a numerical range and a characteristic scale). Links within the matrix between data objects and attribute(s) are based on shared correspondences within partitions. The process exploits mode reduction in which shared correspondences of a BSM (or its graph) interrelate data objects by producing an adjacency matrix or its associated graph. The partition scale is repeatedly and incrementally altered, varying the density of shared correspondences within the data, based on partition number and size; therefore, a fully connected and weighted unipartite network may be established. Shared correspondences' given scale and variable attribute provide distance metrics for edges within the network.

21 Claims, 13 Drawing Sheets

|    | A    | B    | C    |
|----|------|------|------|
| 1  | 7.4  | 3.0  | 5.0  |
| 2  | 6.9  | 5.8  | 7.9  |
| 3  | 11.4 | 4.8  | 6.7  |
| 4  | 11.1 | 6.9  | 9.9  |
| 5  | 8.5  | 8.7  | 12.4 |
| 6  | 16.3 | 9.8  | 13.4 |
| 7  | 16.3 | 12.9 | 17.1 |
| 8  | 21.3 | 13.2 | 17.3 |
| 9  | 28.1 | 14.8 | 19.6 |
| 10 | 33.8 | 16.5 | 21.8 |
| 11 | 26.7 | 16.9 | 22.0 |
| 12 | 20.4 | 17.1 | 22.8 |
| 13 | 28.2 | 19.9 | 26.7 |
| 14 | 38.2 | 20.0 | 26.9 |
| 15 | 33.8 | 22.3 | 28.5 |
| 16 | 32.2 | 24.8 | 34.2 |
| 17 | 39.6 | 25.7 | 35.5 |
| 18 | 45.5 | 25.3 | 34.7 |
| 19 | 49.5 | 27.8 | 32.7 |
| 20 | 46.0 | 29.4 | 29.0 |
| 21 | 55.4 | 30.0 | 28.0 |
| 22 | 55.5 | 32.0 | 28.0 |
| 23 | 48.0 | 32.7 | 28.7 |
| 24 | 55.2 | 34.6 | 36.6 |
| 25 | 52.0 | 36.2 | 44.1 |
| 26 | 60.9 | 35.8 | 44.0 |
| 27 | 64.9 | 38.8 | 48.6 |
| 28 | 64.5 | 41.9 | 51.8 |
| 29 | 56.9 | 43.1 | 52.5 |
| 30 | 60.6 | 46.0 | 54.0 |
| 31 | 67.8 | 45.1 | 53.5 |
| 32 | 74.3 | 44.5 | 53.1 |
| 33 | 74.8 | 47.0 | 54.5 |
| 34 | 73.3 | 48.6 | 55.5 |
| 35 | 75.7 | 52.7 | 58.0 |
| 36 | 78.2 | 51.8 | 57.4 |
| 37 | 78.7 | 55.4 | 59.5 |
| 38 | 87.9 | 54.3 | 58.6 |
| 39 | 88.1 | 58.1 | 61.0 |
| 40 | 85.2 | 58.6 | 61.6 |

*Table 1. Data set with 40 measurements and 3 variables.*

| Scale | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| 183 | 14 | | | | | | | | | | | | | | | | | | | | | | | | | | | | | | | | | | |
| 92 | 11 | | | | | | | | | | | | | | | | | | | | | | | | | | | | | | | | | | |
| 46 | 7 | | | | | | | | | | | | | | | | | | | | | | | | | | | | | | | | | | |
| 23 | 3 | | | | | | | | | | | | | | | | | | | | | | | | 4 | | | | | | | | | | |
| 8 | 1 | | | | | | | 0 | | | | | | | | 2 | | | | | | | | | 4 | | | 2 | | | | | | | |
| 4 | 1 | | | | | | | 0 | | | | | | | | 2 | | 1 | | | | 0 | | | 1 | 1 | | 2 | | 0 | | | | | |
| 2 | 1 | 0 | | 0 | | 0 | | 0 | | | | | | | 0 | 1 | | 0 | 1 | 0 | | | | | 0 | 1 | 1 | 0 | 2 | 0 | | | | | |
| 1 | 1 | 0 | 0 | 0 | 0 | 0 | 0 | 0 | 0 | 0 | 0 | | | | 0 | 0 | 0 | 0 | 0 | 0 | 0 | 0 | 0 | 0 | 0 | 0 | 1 | 0 | 0 | 2 | 0 | 0 | 0 | 0 | 0 |

FIG. 14

Number of Correspondences at a given scale

| Scale | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|---|---|---|---|---|---|---|---|---|---|---|---|---|---|
| 183 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 92 | 0 | 0 | 0 | 0 | 1 | 0 | 2 | 0 | 0 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 46 | 1 | 0 | 2 | 4 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 3 | 5 | 1 | 2 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 9 | 9 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 16 | 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 24 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 26 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 15

Scale 2 Net Stochastic

| | | probability = 1-0.5^number of matches |
|---|---|---|
| Scale 2 probability | 0 | |
| cum probability | 0.0 | |
| avg. | 0.00000 | |
| Cum (x-xi)2 | 0.0 | |
| sigma | 0.0000 | |
| error | 0.0000 | |
| Cumulative Error | 0.0 | |

MULTIVARIATE DATA ANALYSIS METHOD

CROSS-REFERENCE TO RELATED APPLICATION(S)

The present application derives priority from U.S. Provisional Patent Application No. 61/795,127 filed 11 Oct. 2012.

BACKGROUND OF THE INVENTION

1. Field of the Invention

The present invention relates generally to data analysis and, more particularly, to a computer-implemented method for analyzing multivariate data comprising a plurality of samples each having a plurality of measurement variables.

2. Description of the Background

Many technical fields require complex data analyses of large datasets, including multivariate datasets (involving a large number of measured variables). Often the goal of such analyses is to identify hidden structures or relationships between the measured samples of the measurement variables. Where the datasets are extremely large finding hidden structures and/or relationships may take excessive time on existing computer hardware, or may not be possible at all due to limited hardware resources of conventional computers.

There are different approaches for performing analysis and computation on numbers and other datasets. Arguably the largest and most pervasive approach is that of the axis-based virtual coordinate assignment protocol. This comprises a data storage table linked to a means of interrelating the data for visualization and computation (e.g., a scatter plot) even if the coordinate framework is implicit. The coordinate-based systems apply tables to store data, and axial-based constructs defined by scales are the representations of the data tables that show relationships to the data. The axis is thus the intermediary that interrelates data, and this permits data analysis and computation on the data. Every datum is related indirectly to other data via a relationship established with an axis with an established distance metric. As such, it is a device, and axes and dimensions do not necessarily represent any physical or natural manifestations of distance when using variables that lack distance values, for instance temperature. The relationship between an axis and the axial delineations representing different lengths or values that can be chosen to be linear or non-linear, and the numbers themselves can be integers, real or complex. The simplest is a single column of data quantifying measurements of a single variable that is then displayed as a diagram with a single axis and a scale that is a one-dimensional representation like a timeline. Two-dimensional orthogonal axes were developed to apply to geometry and broadened with the representation of space as a three-dimensional manifold described with coordinate system using x,y,z notation or polar coordinates. The geometrical system has been adapted so that any variable could be represented by an axis representing a dimension whether or not it represents spatial information. It has been expanded by using more than three dimensions to encompass and interrelate larger numbers of variables that are usually considered orthogonal but with the potential for varying degrees of correlation. The data table consisting of columns of variables and rows of values can be represented, for instance, as a scatter plot. In practice, this plot reinforces the notion that data occurs on a continuous manifold where each datum is positioned in respect to each of the coordinate axes and thus indirectly via the axes to each other by a distance metric. There are major advantages to this. The basis for storage is the most compact because n data instances can be stored in a table of on the order of proportional to size n. The coordinate system joins data by proximity based on metrics. However, there are also limitations. The human ability to visualize is limited to three dimensions, but the application of additional dimensions beyond three may be necessary to increase the number of variables to apply to, for instance, many dynamical processes (e.g. fluid flow). Visualizations beyond three dimensions is not intuitive. Compression of dimensions is the process of reducing the dimensions that takes advantage of redundant or correlated variables that add no significant information content. Unfortunately, compression based on statistics and functions often loses or distorts information.

The second major limitation of axis-based virtual coordinate assignment protocol is the use of an axis as an intermediary to relate data. This enables relative position and distance measurements to be made relative to the axis. Usually this involves a geometric functional relationship such as the Pythagorean theorem in which $x^2+y^2=z^2$. For path-dependent calculations, this can be computationally problematic. Uncertainty in relating data must be accounted for in terms of accuracy and precision in relationship to the axes. Heteroscedasticity is another issue in which non-linear behavior exists, especially in high-dimensional data sets. High dimensional data sets are by definition sparse, but smooth axis-based systems require dense data and often impractical levels of data collection to achieve statistically valid or useful interpolation or prediction. Each datum must contain information related to each axis to provide a position on the manifold. Missing or erroneous data attributes are not tolerated well with these constructs. For instance, if a datum involves three attributes (e.g., values of x, y and z), and the value of the z attribute is erroneously missing or different than the true value, the spatial position of the point in a scatter plot could be at significant variance with the true value.

Stemming from the use of axes conceptually is the application of regression-based statistical processes to relate data for analysis and prediction. This is at its simplest mapping the data to a line, curve or surface in the data space. Large data requirements are often necessary for statistical validity, but large sets usually are accompanied by noise and errors ascribed usually to accuracy and precision with respect to the measurement axis. Because of the distortion statistical performance can be negatively impacted due to introduced uncertainty between the statistical model and the data. Data cleansing (removing undesirable data) and appending data can be challenging because the approaches used by regression require significant re-calculation. This is because regression usually involves evaluating every datum with respect to the sum of the whole (e.g. using a mean value).

The application of functions to represent compactly the behavior of data on manifolds is also problematic. The same heteroscedasticity, issues of uncertainty, non-linearity, and non-continuity of many real systems present problems for applying functions. Many real systems exhibit path dependency that results in, for instance, chaotic behaviors resulting in bifurcation (two potential outputs for a given input), which is not conducive to functional description. Functions can be developed that have accuracy over only small regions of the problem space. Some functions can be developed that require integration, differentiation or other complex methods to solve in order to generate predictions, but the mathematical function is too complex or impossible to solve without approximations or possibly invalid assumptions.

Another problem is the use of algorithms on the data in this form operate inefficiently with large data sets. Search routines to find, for example, a global maximum must evaluate all of the data instances individually to distinguish local maxima from the global one. For large data sets, this becomes computationally challenging.

A second major approach to data analysis distinctive from the coordinate-based approach, graph theory, has become an indispensable tool in studying complex datasets, and a graph system can exist that is an analog to the coordinate geometry system to perform analysis and computation. Graphs have the potential near-universal applicability to data analysis. Washio, Takashi and Hiroshi Motoda, *State of the Art of Graph-based Data Mining*, SIGKDD Explorations. 5:59-68 (2003). Ordinary graphs are the predominant type, but bipartite graphs have been shown to be more robust as a description of real entities. A bipartite graph or "bigraph" is a set of graph vertices decomposed into two disjoint sets such that no two graph vertices within the same set are adjacent. The multivariate approach to generate the bipartite graph from an attribute table is detailed in De Leeux, Jan and Michaildis, George, *Data Visualization Through Graph Drawing*, Comput. Statist., Vol. 16, pp. 435-450 (2001). Bipartite graphs (or bipartite matrices) offer a means of representing information for analysis but it is not particularly intuitive for human viewing because of the missing distance metric. Large numbers of correspondences, links between the disjoint sets, can make evaluating relationships within data difficult, and statistical analysis is generally simpler when performed on ordinary graphs.

Bipartite matrices and bigraphs can be converted to an ordinary graph by "mode reduction" where nodes (aka "vertices") of one mode become the vertex or node of the ordinary graph. Shared correspondences occur when multiple objects in the first disjoint set share attributes in the second disjoint set. Shared correspondences are used as the basis for links or "edges" within the ordinary graph. An ordinary graph is a visual representation of an adjacency matrix. Again, the concept of distance between nodes of an ordinary graph, as with a bipartite graph, does not represent a distance metric as established with coordinate geometrical techniques. Links or edges represent relationships that can be directed, weighted, or unweighted. However, there is a general problem with mode reduction in that either the correspondences are too dense, too many to manage, or too sparse and fragmented, which results in a graph that is not visually appealing, too difficult to render, or too big to manage. Various approaches to reducing dense graphs have been applied including filtering links randomly or based on limiting the degree (number of links sharing a common node) of nodes within the graph. This risks losing information and distorting the graph as well as any subsequent statistical assessment of it. Furthermore, techniques for mode reduction of multivariate bipartite graphs have not been established that enable edges to represent different variables with distance metrics. Thus, ordinary graphs have been considered poor alternatives for managing multiple variables and multivariate data.

Ordinary graphs containing multivariate components are sometimes placed in a statistical coordinate system and converted to a spatial representation statistically (2 or 3 dimensions) through a statistical compression algorithm such as Principal Component Analysis to achieve a axis-based distance metric between data with the subsequent distortion and loss of information. The major problem with ordinary graphs is the concept of distance. Two nodes not directly inter-linked or joined by a common edge are related in terms of a quasi-distance by the minimum number of links or the average number of hops, but this can be complicated by directed edges or edge weighting. Furthermore, this path dependency might involve evaluating every possible path or some statistically value number of them to establish the shortest path. This can become computationally intractable for large data sets. No system of applying a physical distance inherent within a data set analogous to that of coordinate systems has been devised without some sort of statistical compromise as described above.

The concept of all-to-all weighted graphs representing relative distances between all nodes has been considered that would enable said distance metrics to be applied, but as mentioned this has remained computationally impossible for any but relatively small data sets. The simultaneous linkage of every node to every other node becomes computationally challenging for large sets of nodes because the number of required relationships increase proportionately to the square of the number of vertices. The calculations to determine each edge distance requires some exponential set of measurements. As mentioned above, each distance would require the measurement of every possible series of pathways to establish a minimum path length. The visualization of such a graph would be unappealing for large data sets because of the clutter of so many relationships. Navigation and statistical analysis would be excessively challenging. Dealing with more than one variable would be problematic because of the potential for differing distance metrics and weighting, which would require blending or some sort of statistical filtering.

Two major limitations have hindered the development of a graph theory-based analog to coordinate geometry. For one, a satisfactory distance metric that is not path dependent has not been established analogous to that in coordinate geometry. The second hindrance has been a lack of means to handle more than a few variables with the same type of ordinary graph that distances must be evaluated on. As a result of these shortcomings graphs have not been used as an alternative to coordinate geometry to perform computation. The current invention is a graph analytical process that solves this.

SUMMARY OF THE INVENTION

It is therefore, an object of the invention to provide a computer-implemented method for managing large, sparse data sets, and to update large data sets without having to adjust mean-based regression or other statistical assignments that would otherwise require learning algorithms to undergo significant computational and supervised change to adapt to new data.

It is another object to provide a computer-implemented method for analyzing large multivariate data sets that resolves issues of noise, missing data and non-linearity which would otherwise distort most regression-based processes and frustrate statistical and function-based modeling.

It is another object to provide a computer-implemented method for handling multivariate data with graph theoretical approaches in a way that generates an inherent distance metric without excessive computational burdens.

It is another object to provide a computer-implemented method for managing large data sets that applies graph theoretical methods to computations and software development for use against hard computational challenges such as optimization problems.

It is another object to create an equivalent framework to the coordinate system that establishes a simultaneous distance metric and relative position using graph theoretical methods.

Still another object of the present invention is to provide a random number generation process, the generation of truly random numbers by algorithms that generates arbitrarily large, non-looping number sets in a way that cannot be reverse-engineered or otherwise compromised if a one-time pad is compromised or if the seed is known.

In accordance with the foregoing object, the present invention is a method of uniting data through the means of a bipartite matrix. The method begins with a multivariate data set comprising a series of data objects that depend on multiple variables or attributes.

In a first step the multivariate data set is stored in a rectangular matrix called a "bipartite synthesis matrix" (BSM) represented as a large table with rows of data objects or measurements and columns defined by a plurality of partitions representing intervals over a fixed range of a variable. In accordance with the invention the partitions have an adjustable scale that governs partition size and thus the number of partitions fitting within a fixed range of the variable. The scale R can be changed to adjust partition width as a consequence affect the aggregation of data within the bipartite matrix.

The scale governing the partition width and thus the number of partitions in a fixed range is adjusted to achieve coarse-to-granular aggregation of data within the bipartite matrix (or granular-to-coarse). This manipulates the occupancy levels of the data by aggregating or disaggregating correspondences within partitions, which makes the aggregation hierarchical from coarse (highest in hierarchy) to most granular (lowest in hierarchy) and supports relative distance determination and relative position. This multi-granular data aggregation operation is achieved by a suitable multi-scale, hierarchical or other adjustable data aggregation mechanism. For multivariate operations, each variable has a distinct range with adjustable partitions. Any number of variables and partitions can coexist within the bipartite synthesis matrix. A decision process must be established to define the extent of scales for each variable from most coarse through most granular. This can be devised based on the maximum range of numerical data and repeatedly halved until the finest granularity is achieved that matches the finest values of the data measurements. Each variable could undergoing the process of aggregation separately, but it is more likely that at each scale, the variables will be evaluated in parallel to establish a broader range of shared correspondences. It is the number of shared correspondences at given scales that are manipulated by supervised or unsupervised algorithms to achieve the conversion from bipartite or unipartite graph structures.

In a second step a series of one or more "adjacency matrices" are generated from the BSM at different scales of the data. Shared correspondences identified on the right side of the BSM become the basis for assigning edges within the ordinary graph, and these correspondences are used to build the adjacency matrices. The changing numbers of the correspondences that exist at different scales can be used for extracting information with minimal computation and storage requirements. Shared correspondences in terms of number and scale can be used to prioritize or exclude relationships based on relative importance. For instance, a relationship at a coarse scale could be deemed to be unimportant relative to a correspondence established at a more granular level based on greater uncertainty of relative data relationships within the coarse scale. Moreover, a large number of interrelated links between a cluster of nodes generates symmetry. Each link within an all-to-all cluster might be of lower importance compared to asymmetrical links joining two clusters, that could be ranked as more important. Thus, a prioritization framework can be achieved to avoid the problems of complete graphs representing all-to-all distances by only representing distances that are important (and data proximity is established even if an explicit link between two data objects is not shown).

In a third step each adjacency matrix is rendered as an ordinary adjacency graph that is engineered to establish path-independent distance metrics (i.e., to establish simultaneously relative position and distance independent of conventional path evaluative techniques mentioned earlier). The adjacency graphs can be consolidated into a single adjacency matrix and rendered using standard graph drawing processes by algorithms such as those termed force directed or spring-based. Scale could be used to define the weight of links. The weights would be expressed in terms of a physical distance. This could be accomplished by having a series of springs in an edge equal to the scale. Thus a small scale would result in a short length and larger scales in proportionately longer lengths. Alternatively, the spring constant could be adjusted for different scales: tighter for small scales and progressively looser for larger ones.

In an alternate embodiment, the above-described method is implemented as a less costly means of generating random numbers capable of generating large, non-looping sets of numbers and that could not be compromised even if the algorithms and the seed are both compromised.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 2 is an exemplary multivariate data set with 40 measurements and 3 variables A, B and C.

FIGS. 5(A&B) show a BSM of a single, larger data set consistent with that used in FIGS. 2-3 and also in FIGS. 6-9.

FIG. 12 is a portion of the BSM for the Stochastic Birthday problem.

FIG. 13 shows correspondences generated at different scales for the 30 random birth dates from the BSM of FIG. 5.

FIG. 14 is a Degree Connectivity Table which calculates the numbers of correspondences that exist per date partition at different partition scales, again for the BSM of FIG. 5.

FIG. 15 illustrates the stochastic calculations for the BSM of FIG. 5.

DETAILED DESCRIPTION OF THE PREFERRED EMBODIMENT

Figure 1:
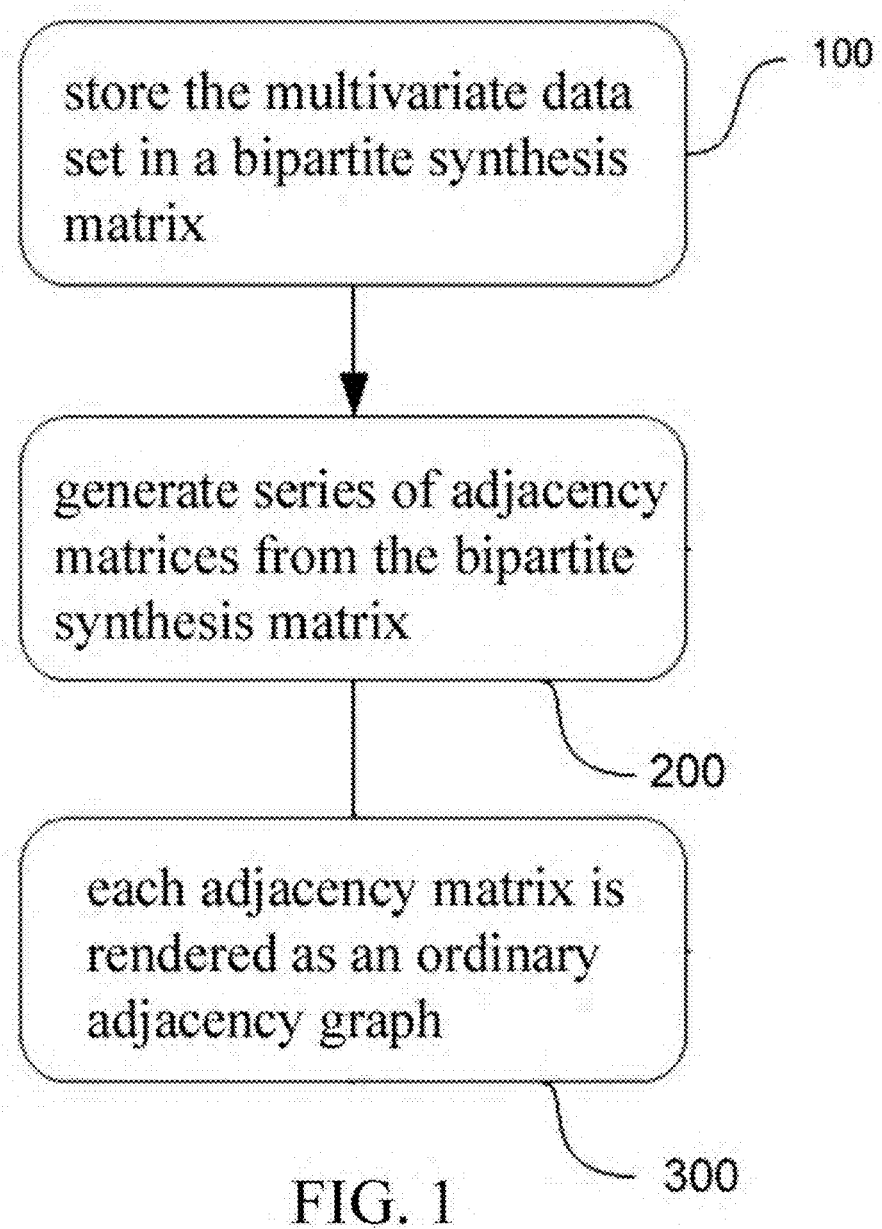
FIG. 1 is a flow diagram of the present method.

The present invention is a computerized method of analysis by use of a bipartite matrix and a multi-granular data aggregation operation (multi-scale, hierarchical or other adjustable data aggregation mechanism) in order to sort, partition, rank, aggregate, display, filter, and otherwise relate data to promote a broad range of activities. The invention also contemplates an improved pseudo-random number generator using the same approach. The invention partitions, aggregates or otherwise processes the attributes and the populations of occupancies within the attributes or the correspondences which are multiple shared occupancies. This is used to manipulate the occupancy levels of the data by aggregating or disaggregating correspondences. As one aggregates attributes, the number of occupancies and correspondences tends to increase for any particular attribute. If one disaggregates attributes into finer categories, the density of occupancy tends to decrease.

The software method is preferably implemented on a hardware foundation comprising at least one processor, at least one storage device, and miscellaneous interfaces to support data collection, storage and exchange between various participants. The processor may be of any suitable type such as a PC, a server, a mainframe, or an array of processors working in parallel. The storage device also may be of any suitable non-transitory type, including magnetic, electronic, and/or optical media. The miscellaneous interfaces may include interfaces to user input/output devices such as keyboards, screens, pointer devices, printers. In addition the miscellaneous interfaces may include interfaces to networks such as LAN networks or the Internet. The storage device stores program code for informing operation of the processor, including a modular array of software for data aggregation, storage and exchange between the various participants. In accordance with the invention, the software method is implemented on a multivariate data set, which may be externally aggregated and compiled but is locally stored on the storage device. The multivariate data set comprises a series of data objects that depend on multiple variables or attributes. A data "object" is herein defined as any event, measurement, number, or anything else to which "attributes" can be ascribed. Attributes may be any discrete entity associated with the object. The attributes could be different types of variables or even mixed variables with some attributes being numerical ranges and others representing non-numerical features. Attributes could be Boolean or binary and some attributes might remain unalterable while others are aggregated or disaggregated. For example, a dataset of people may have multiple attributes such as height, weight, shoe size, etc. A dataset of weather may have multiple attributes such as temperature, humidity, wind speed, visibility, UV index, etc. The present invention provides a software solution for analyzing large, complex multivariate data sets quickly, easily and accurately.

FIG. 1 is a flow diagram of the present method.

Figure 3:
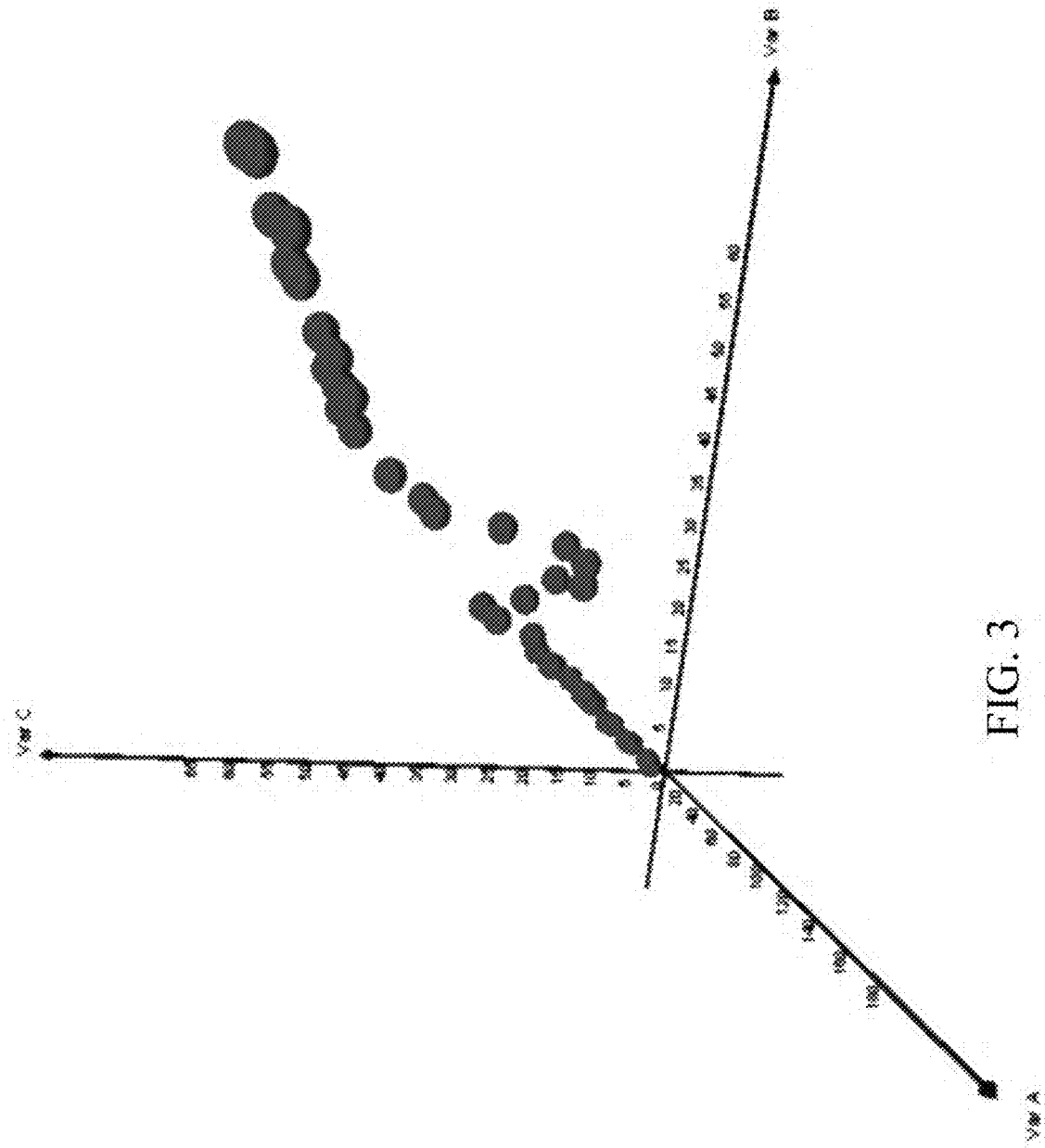
FIG. 3 shows the data set of FIG. 2 in a scatter plot defined by three axes.

The method begins with a multivariate data set comprising a series of data objects that depend on multiple variables or attributes. FIG. 2 is an exemplary multivariate data set with 40 measurements and 3 variables A, B and C. FIG. 3 shows the data set of FIG. 2 in a scatter plot defined by three axes that is a conventional method of presentation for analysis. Each point represents a measurement (independent variable).

The method comprises a first step 100 of storing the multivariate data set in a rectangular matrix called a "bipartite synthesis matrix" (BSM) or equivalent device stored on a computer. The bipartite synthesis matrix can be represented as a large table, and there can be any number of objects and attributes. Thus, for example, the left column of the bipartite synthesis matrix may contain the objects, and the top row of the matrix contains partitions of attribute values, with partition-size having an adjustable-scale. The partitions collectively span the entire range of attributes of the data set. At any given partition scale if an object has a particular attribute, then the matrix will contain a "one" entered in the row-column intersecting cell. Otherwise, if an object lacks an attribute the cell would have a null or empty notation.

Scale is defined as the number of regular partitions or intervals within a variable range of the bipartite matrix. For instance, if a range is 1-32 and there are 8 partitions, the scale is 4; the number of partitions can increase to 32 when each interval is reduced to unit 1 in size. As such, any data object occupying an interval at that scale corresponds with any other data object that shares that interval. This sharing does not mean that the corresponding data objects are identical, just that they correspond at that scale for that variable's attribute.

The partition scale of the bipartite synthesis matrix (BSM) is incrementally adjusted to establish data correspondences throughout a range of scales from lower scales (finer granularity) to higher scales (more coarseness). This way, if a data object (measurement) and a given scale occupies the same partition/interval as another data object at a given scale, the data object is related and for all intents and purposes indistinguishable. This relationship is established by the scale of the data, which is adjusted as above to make the relationships evident. Progressive scaling establishes different clusters of data objects and allows extraction of the maximum information content from the data set without distortion from regression or other forms of multidimensional analysis that suffers from missing data and heteroscedasticity.

The foregoing BSM approach establishes two related data metrics: 1) absolute distance between two data objects; and 2) relative position within a hierarchical framework via different scales. Close proximity data objects share correspondences at lower scales (finer granularity) when they are more proximate to each other. For instance, a data object of value three is more proximate to a data object of value ten than to a third of value 300. Nevertheless, at partition unit scale one, all three data objects are unrelated per se. Data objects with respective values of 3 and 10 become associated at some scale equaling or exceeding seven. However, it is not until a scale approaching 300 is reached that all three data objects are associated. The change in scale necessary to achieve this association, or relative position within the hierarchical framework, represents "relative proximity." Both distance and relative proximity are simultaneously captured.

Figure 4:
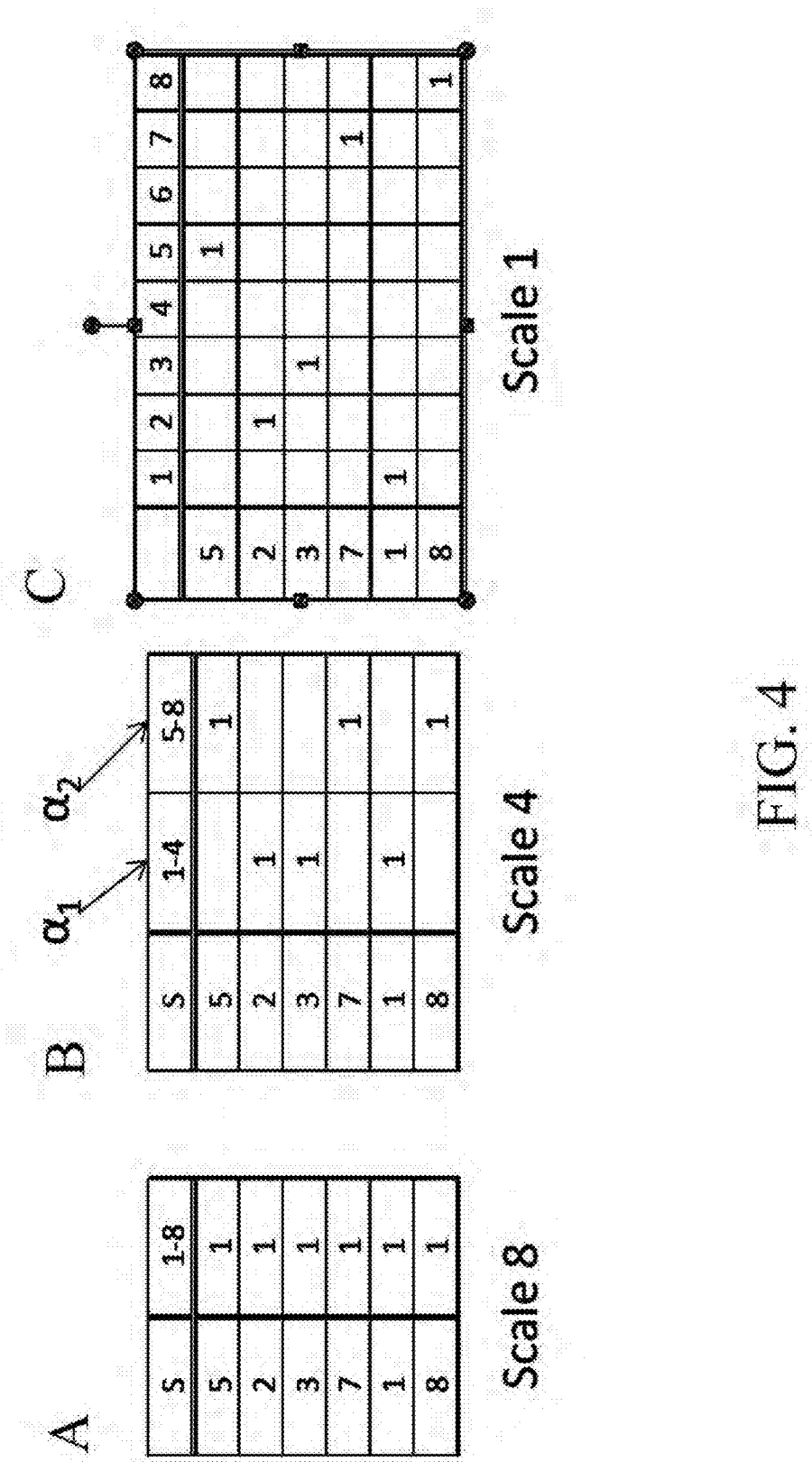
FIG. 4(A) is an exemplary BSM at a first scale R.
FIG. 4(B) shows the BSM of FIG. 4(A) with the variable scale R halved to generate two child partitions.
FIG. 4(C) is a partial attribute table containing the synthetic data generated for one variable A as a result of the multi-scale process described above.

FIG. 4(A-C) is an exemplary BSM of object set size S (left column), an attribute range of 1-8, and a single attribute interval or "partition size" spanning 1-8 (top row), and with notation "1" indicating occupancy. The left-most column is the integer set S. In this case S is a random set of numbers ranging from one to eight so that the interval range encompasses the set's range of values. Correspondences occur when rows share occupancy of a particular range column. Thus for each enumerated partition there is a notation in a row indicating if an integer occupies a particular partition ("1") or is not present within the partition (empty). The matrix is termed bipartite because the data set (left column) represents one of two modes, and partition interval represents a second mode. Each interval 1-8 (top row) is a sequentially ordered and spans a defined range from one integer value on up to a predefined integer scale such that a single interval spans the entire range of the integer set S. The other columns arrayed to the right of the integer column represent occupancy partitions, the topmost row denoting the value assignments. The occupancy partitions are columns that always extend vertically to include all of the integers from one unit up to the complete interval of integers.

In accordance with the present invention the occupancy partitions of the BSM are set along an adjustable scale R. The adjustable scale R is a whole number that governs partition size and thus the number of partitions fitting within an interval. The scale R can be changed to adjust partition width as a consequence affect the aggregation of data within the bipartite matrix. Scale is varied to change partition size, from a course scale 8 (at A) to an intermediate scale 4 (at B) to a most granular scale 1 (at C). Note how the density of shared correspondences declines as the scale is reduced. The maximum R is conveniently a value that equals or exceeds some value $2^j$ so that repeated halving will eventually reach the unit scale exactly. As the adjustable scale R becomes coarser the correspondences increase at coarser scales. Thus, in FIG. 4(A) there is a single partition extending from 1 to 8 over the entire range, which would be the coarsest scale. However, in FIG. 4(B) the variable scale R is halved to generate two child partitions labeled $\alpha_1$ and $\alpha_2$. In this case each partition $\alpha_1$ and $\alpha_2$ has fewer correspondences although an increase in its information content. For example, all correspondences shown in FIG. 4A are within eight integers from each other, but partition $\alpha_1$ in FIG. 4B contains four corresponding integers indicating that the associated integers are within 1-4 in value based on that occupancy state and are all within four units of each other. Partition $\alpha_2$ on the other hand also shares four correspondences with distances of 4 units, but the integers are a value of between 5-8. FIG. 4(C) shows this process the matrix for the same data set with eight, unit-scale partitions to show how the multi-scale process affects correspondence density over a series of granulation stages. In this chart the attributes are at the most granular and contains no correspondences. From this it is evident that the correspondence density decreases with granularity from FIG. 4(A) to (C). The ability to adjust scale R of partition width to achieve coarse to granular aggregation of data within the bipartite matrix is an essential feature of the present invention. This effectively makes the partitions hierarchical in an unsupervised way that can interconnect every data object and simultaneously enables scale-based distance metrics and relative position establishment. The scale R is adjusted in stages j so that, at each stage j of the multi-scale process, R halves until the unit scale is reached and each partition's maxima and minima becomes identical.

Various heuristics can be devised for approaching the coarsening in terms of attribute divisions. One simple unsupervised method is through progressively doubling the number of partitions from one until the interval reaches unit value (1, 2, 4, 8, 16 . . . ). Another option could be to apply the Fibonacci sequence to the number of partitions going from 1, 2, 3, 5, 8 . . . until the number of partitions exists that are of unit value and span the range. Granulation can be standardized by normalizing the data to a predetermined value range and pre-determined rate of coarsening. The bipartite graph can be re-drawn successively for every level of granularity to support drawing of the ordinary graph. Coarsening affects the topological properties of the unipartite graph to be developed.

One skilled in the art should understand that any other suitable data aggregation scheme may be employed including a hierarchical approach to the attribute modal data, as a substitute to multi-scaling. Thus, "multi-granular data aggregation operation" means multi-scale, hierarchical or any other suitable adjustable data aggregation mechanism.

The process of evaluating relationships by the scale and quantity of links between nodes can be supplemented with other rules to perform computation (find subsets of data) analogous to those algorithms that apply functions to perform computation in coordinate systems. Instead of individual values, interval partitions are evaluated to determine if they obey a set of rules. This is exemplified in the solving of the Subset Sum Problem (Example 2). The filtering requires the extremes of the partition intervals to bracket the target value of the subset sum problem. This is a fundamental rule-based filtration that could be applied to factoring primes for instance or doing different so-called optimization problems. The same approach to filtering by rules can also be applied with addition, subtraction, multiplication, division, or various combinations to achieve a desired rule just as a function involves those relationships applied to numerical variables. However, any other suitable formula may be mathematically devised to filter correspondences, including binary (e.g. Boolean true-false) comparison to include or exclude correspondences. For non-numerical relationships but ones that occur in some hierarchy, the positions in the hierarchy can be used to prioritize filtration of correspondences. For instance, speciation is a hierarchical classification system whereby a network can be established. All-to-all distance relationships can be established, but it is preferred to filter based on level in the hierarchy. The level in the hierarchy is used as a proxy for numerical scale. For correspondences that share the finest granularity and for which no distinguishing feature is available, it may be necessary to use stochastic processes to cap the number of correspondences "displayed" or to otherwise denote that the data objects are indistinguishable by collapsing them into a single node/cluster. For instance, if a group of species within a genera are all related but no information exists to put any in hierarchy of precedence over any other, then they must be related all-to-all. There are many ways to express the correspondence relationship including making them a single cluster with a group link to other elements of the network or a single node or a cluster with all or a few links represented.

The BSM (FIG. 4A-C) can contain any number of variables and attributes. There is no order for which attribute occurs first although there may be some heuristic approaches devised for large numbers of variables. Other variable attributes can be appended by extending the table, and the entire assemblage could be contained in a relational database. The number of attributes should be just enough to produce separation within the data similarly to how a scale is adjusted on a coordinate axis for effect. Numerical data could be normalized, and a standard set of values increments progressing from low to high could be established. For the example, the variable attributes range from 1 to 100 with unit attribute values as the minimum range. The attribute value range is shown with linear progression, but other kinds could be used including, for example, a logarithmic progression.

The following examples provide detailed implementations of the method:

EXAMPLE #1

Data Visualization and Graph-based Distance Metrics

This example describes a process by which a data set is used as a basis for developing a fully connected weighted graph that is multivariate in nature and that minimizes or otherwise optimizes the amount of edges while establishing inherent distance metrics analogous to a coordinate system.

Figure 5:
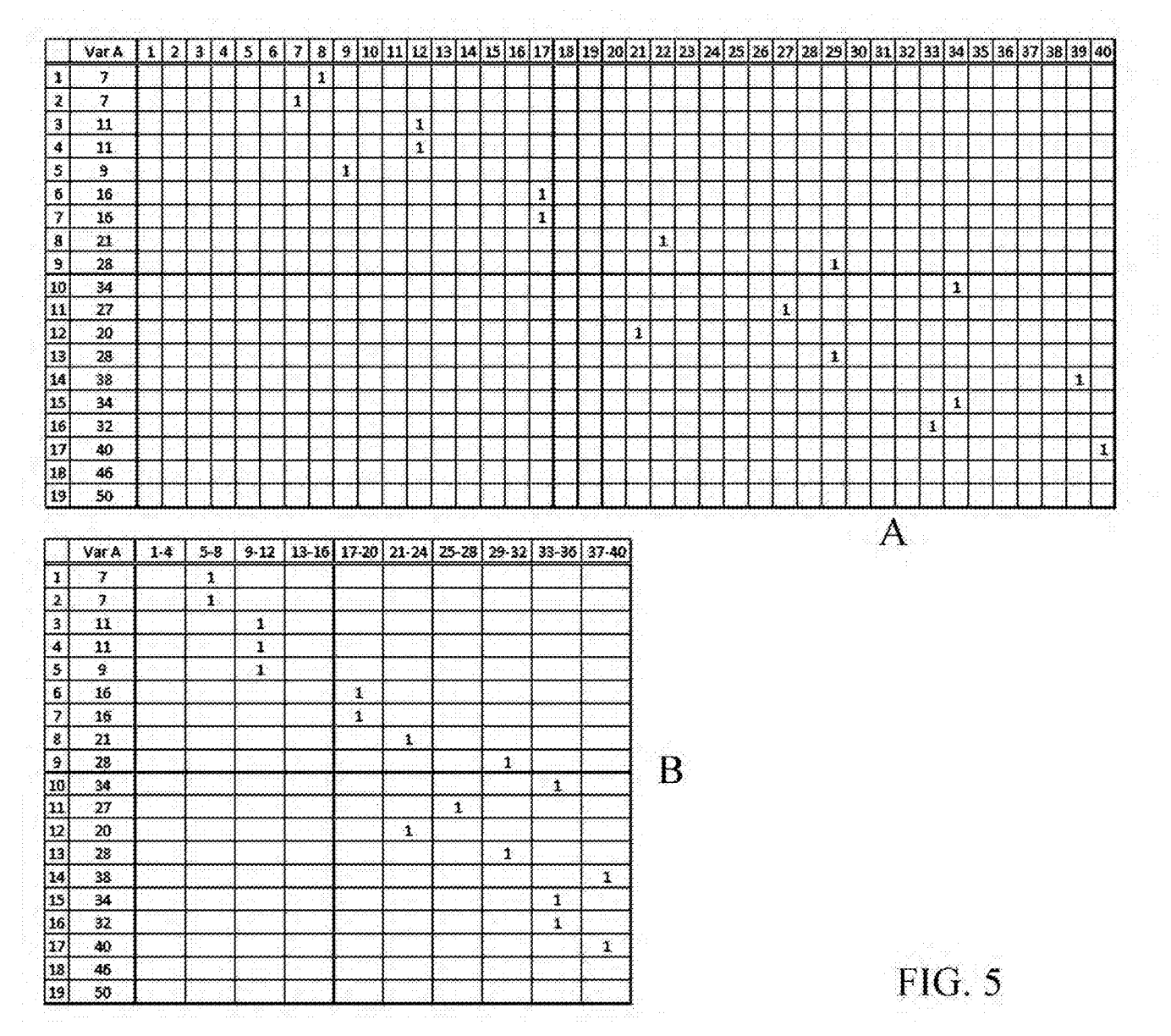

FIGS. 5(A and B) show a BSM of a single, larger data set consistent with that is used in FIGS. 2-3 and also in subsequent FIGS. 6-9. This FIG. 5(A) contains a portion of the single data set of 40 "measurements," notional values arrayed on the far left column. Not all values are shown. In this case, the BSM is displayed at the unit different scales indicate the correspondences between data and unit-scale partitions. Few shared correspondences exist. FIG. 5(B) has a scale of four units and an increase in density in shared correspondences. It should be evident that the number of correspondences increases as fewer partitions are used.

Figure 6:
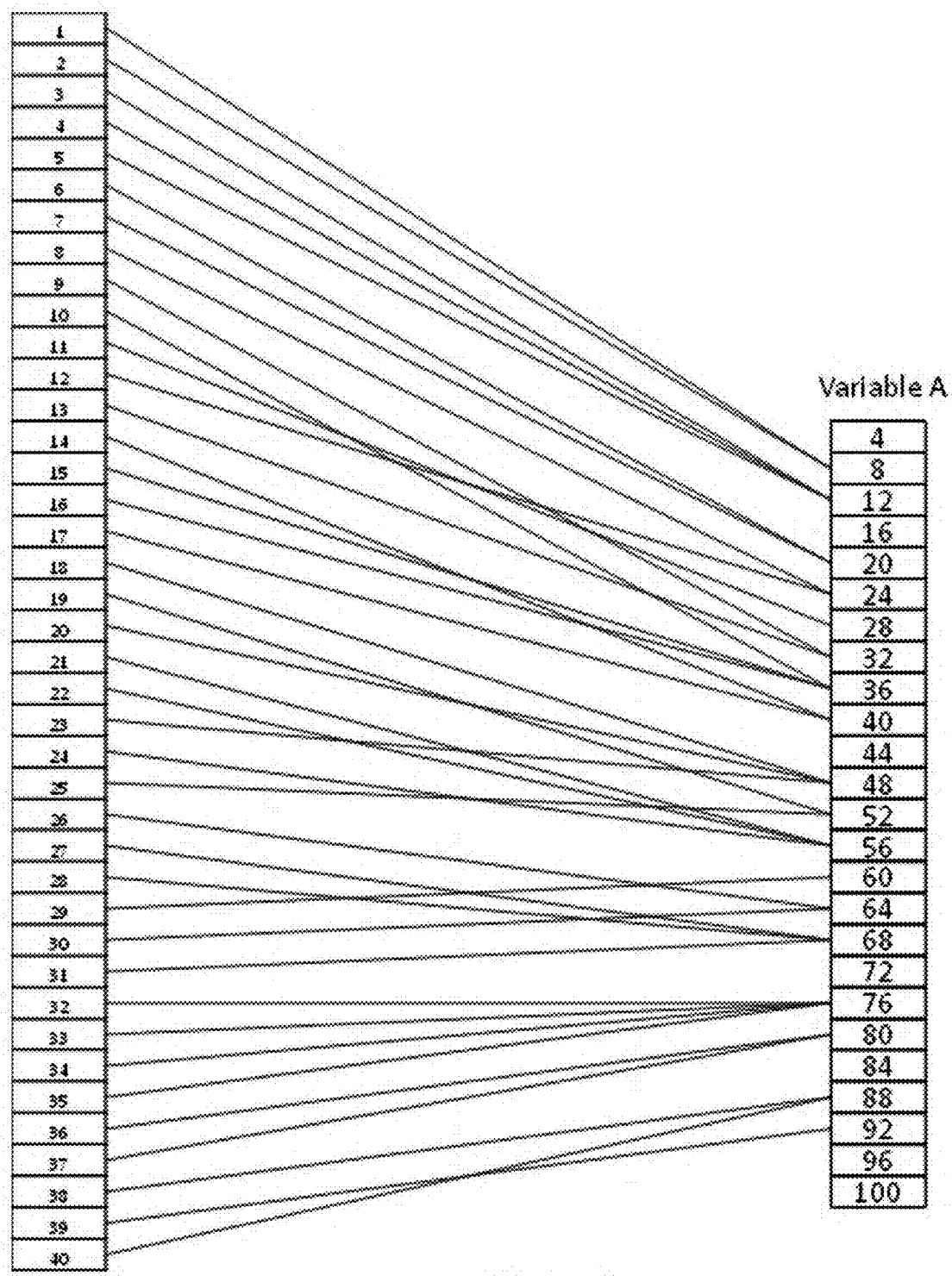
FIG. 6 shows a multivariate bipartite graphical illustration of the attribute table of FIG. 4C.

FIG. 6 shows a bipartite graphical illustration of the attribute table of the BSM of FIG. 5, representing only a portion of the graph because it only contains attributes for variable A. The bipartite graph could have the additional data objects linked to other attributes including those of other variables on the right, each subdivided into value partitions. The edges extending between the two tiers of vertices represent correspondences between the data objects, left, and attributes are the nodes on the right. Measurements that share attribute vertices indicate a relationship, a shared correspondence, which is used subsequently to establish graphical connections. The multi-scale approach described above prioritizes edge link relationships based on proximity as established by scale, and is thus resistant to random noise, missing data and erroneous information. For instance, if a data error were to occur, it is more likely that an erroneous data value would be filtered out through the multi-scale process because the noise would result in variations that would occur over large values that would generate relationships at only large scales. The exclusion would not damage the network graph because of the integrity established within the network of other data. Because the system is discrete, it is suitable for sparse datasets and non-linear behavior associated with continuous data is not an issue.

Moreover, the bipartite relationships can be converted into an ordinary graph through the aforementioned one-mode reduction. Referring back to FIG. 1, in a second step 200 a series of one or more "adjacency matrices" are generated from the bipartite multivariate matrix of step 100. Just as the attribute table is the basis for the bipartite graph, the adjacency table is the mathematical tool commonly used to describe a unipartite or ordinary graph. The vertices of the ordinary graph are the same as the vertices on the left side of the bipartite graph. The shared correspondences identified on the right side of the bipartite graph become the basis for assigning edges within the ordinary graph.

The foregoing correspondences are used to build an adjacency matrix, the basis for visualizing the ordinary graph. In a third step 300 (FIG. 1) each adjacency matrix is rendered as an ordinary adjacency graph that is engineered to establish universal distance metrics (i.e., to establish simultaneously relative position and distance). The adjacency graphs can be rendered using standard graph drawing processes by algorithms such as those termed force directed or spring-based.

In the bipartite graph of FIG. 6 there are 40 data objects to the left. On the right are 35 intervals of scale value 4 that serve as attributes of a variable "A". The relationships between objects and attributes are diagrammed through edges that span the two sides. Even at this coarseness there are still some data elements that are not interconnected (e.g., data element 29). For purposes of demonstration the bipartite graph with the finest granularity is used to start filling the adjacency matrix using a one-mode reduction approach. Because this is the highest granularity, it should be expected to produce the sparsest graph. This step of "filtering based on scale" determines each shared correspondence from the bipartite graph which is captured in a cell of the adjacency matrix. If a shared correspondence occurs for two data objects for attribute A at a coarseness of 1, a code is entered into the matrix in the illustration as "A1." For drawing the graph, only the shared correspondences using variable attribute of the finest granularity are entered into the matrix. The process continues with increasing attribute coarseness, which gradually fills in the adjacency matrix.

Filtering based on scale is just one exemplary method of mapping the number of correspondences using an all-to-all representation. However, other approaches to filtering may be used to further reduce excessive information content. For example, filtering may include capping the number of correspondence links per vertex (in graph theory parlance this would be degree limitation) due to the obviousness of many all-to-all relationships, for instance. Once a few links are established, the proximity and interrelationships are identifiable, and the additional links are unnecessary. The process for removing extraneous links within a cluster could be established randomly if only a single variable is evaluated and there is no other basis for selection. If there are more variables, then other variables could be used to generate information about filtering correspondences of the variable in question.

Figure 7:
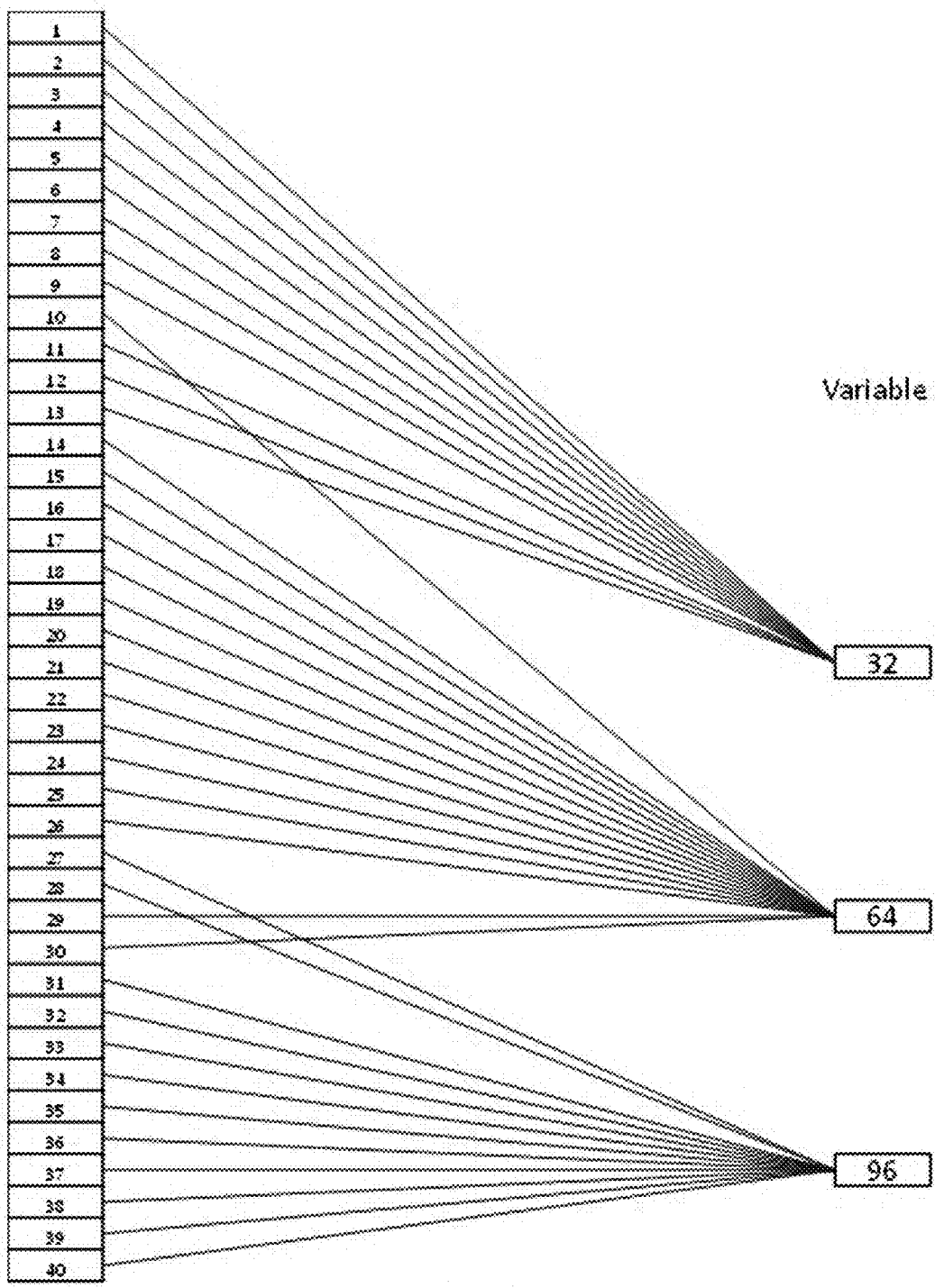
FIG. 7 is a depiction of the same bipartite graph but applying coarser, 32-unit value attributes of variable A.

FIG. 7 is a depiction of the same bipartite graph but applying coarser, 32-unit value attributes of variable A. Bipartite graphs of coarser attributes would be expected to have more common attributes and thus be more interconnected. At this coarser level, data elements are in one of three clusters.

It should now be clear that the BSM described above facilitates bipartite mode reduction to ordinary graph. The method is suitable for multivariate data because of the nature of the multi-scale prioritization process. Because the system is not regressive or based on modeling of functions or on compression, the system can be appended, which simplifies processing and updating/learning.

If desired, the entire process can be repeated to revise the resulting adjacency matrices in order to change the appearance or add additional data.

In addition, data objects can be appended to the BSM by adding them to the bottom of the rectangular matrix and developing the additional correspondences as already described. The correspondences can be established by employing new and existing variables within the bipartite matrix and just providing the notations of which partition occupancies are shared by the new data objects. Fusing data is accomplished by adding different data objects to the bottom (conceptually) of the bipartite matrix and adding variables to extend the horizontal expanse of the matrix. Fusing is limited to related data because there must be some overlap in data objects' relationships established by shared variables in order to extend correspondences among different data sets.

Figure 8:
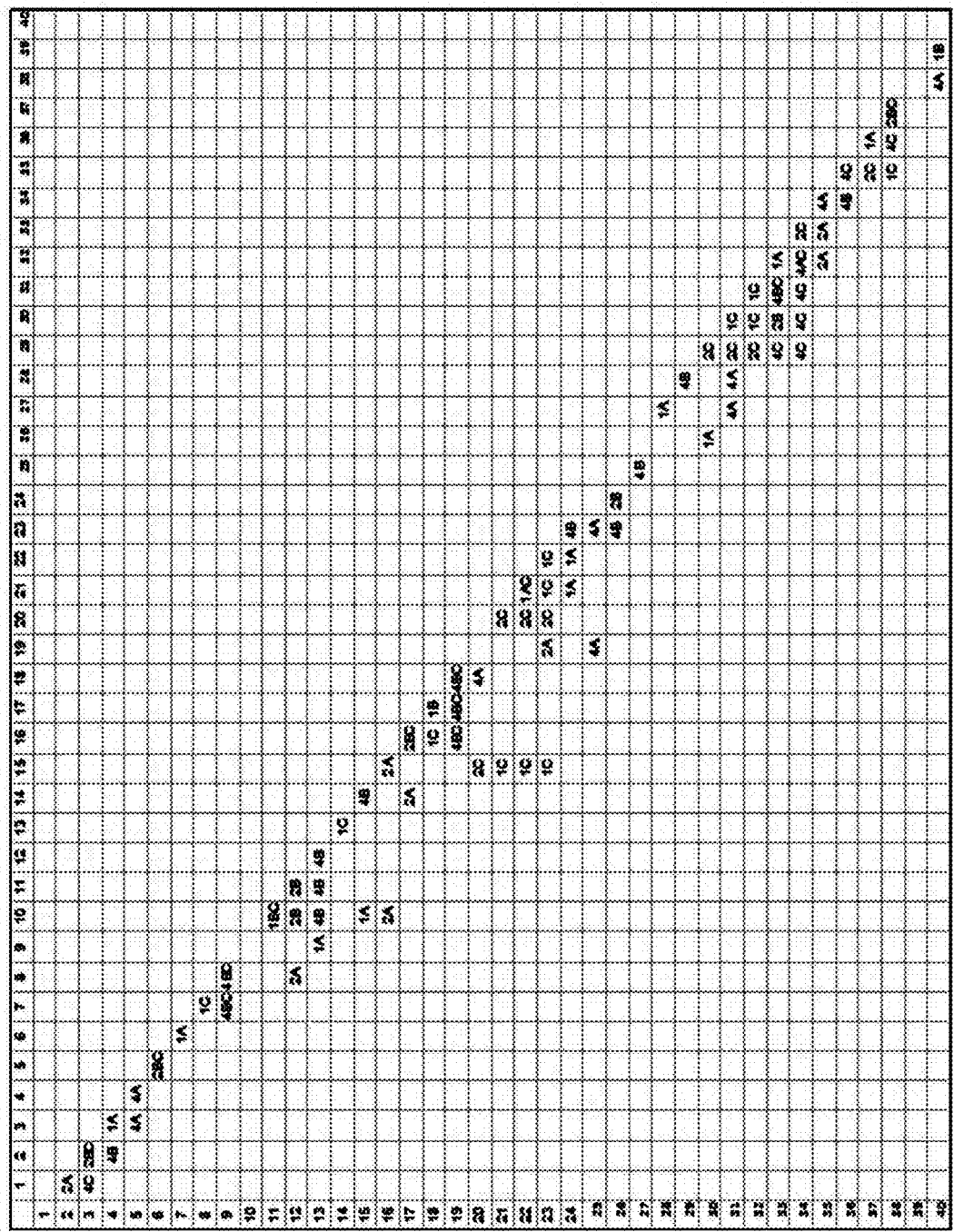
FIG. 8 is an adjacency matrix derived from the multilevel process applied to the multivariate data.

FIG. 8 is an adjacency matrix derived from the multilevel process applied to the multivariate data. The example adjacency matrix shows correspondences from the coarsening process described (Table 3). With the multilevel process a link between two vertices (data objects) is established using the finest granularity correspondence of a variable attribute. The edge correspondences shown include the attribute unit granularity and variable. Code 2A for instance signifies that the finest shared correspondence is for Variable A and granularity scale of 2 units. The adjacency matrix does not represent a complete (all-to-all) graph although the process could be continued until all cells in the matrix are filled. Here the process was continued for multiple levels of granularity and halted when it became fully connected. Heuristics, statistics and visualization tools can be used to determine automatically or semi-automatically when a graph network is fully interconnected in addition to simply filling in a complete adjacency matrix. All of the matrix could be completed because of the inherent nature of the process of increasing coarsening. If the edges established in the adjacency matrix were to be used in a weighted graph, it might be worthwhile to complete a fully connected graph. For this example, an unweighted graph was drawn, and the increasing number of edges would distort the graph.

The coarsening is applied simultaneously to all attributes and the order of attributes is arbitrary. It might occur that two or more attributes each share the same correspondence at the same level of granularity. Those correspondences typically would represent stronger relationships, and multiple correspondences could be inserted into the matrix cell. The prioritization based on multiple correspondences and levels of granularity provides a robust means of selecting edges and assigning weights for a graph. For this example, that was not shown. The priority of edges and direction by which the adjacency matrix can be modified for local or global rules for different reasons. Other constraints may be placed on the adjacency matrix to filter links based on topological properties such as degree connectivity.

The graphs can be rendered using standard graph drawing processes by algorithms such as those termed force directed or spring-based.

Figure 9:
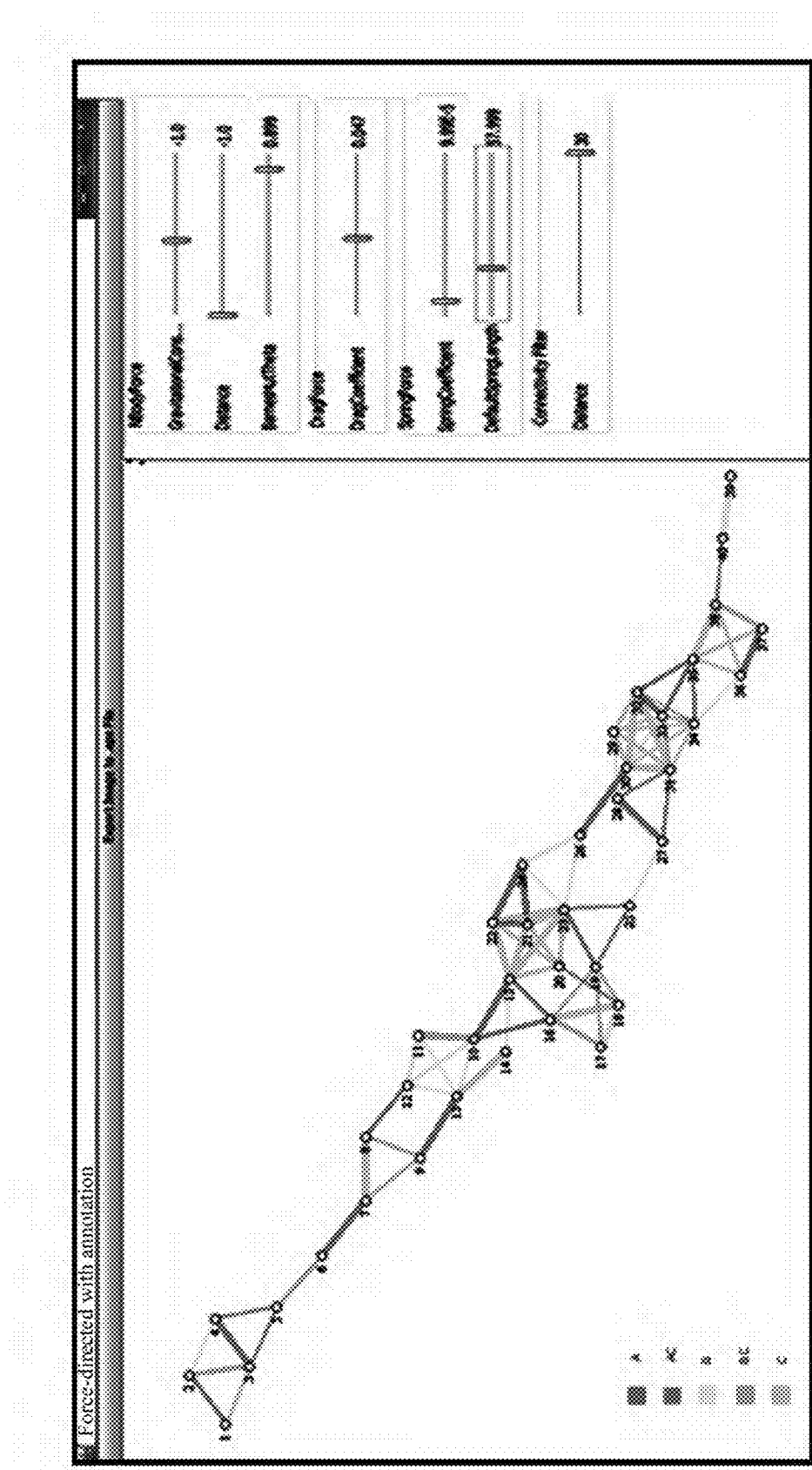
FIG. 9 is an exemplary graph rendered from step 300 using a force-directed method with the associated parameter settings depicted from the screen capture.

For example, FIG. 9 is an exemplary graph rendered from step 300 using a force-directed method with the associated parameter settings depicted from the screen capture. The BSM eliminated distant coarse links and extraneous links through the filtration process. Even though the drawing process applied links that were unweighted based on the scale-based associations of the process, the process nevertheless produced a graph that shows proximity and trending if not quantitative distance metrics. This graph was produced by Prefuse™ Beta (an open source force-directed algorithm) and the vertices were adjusted in orientation similar to the arrangement of the scatter plot. The numbers correspond to the objects enumerated in FIGS. 2-6. The edge colors correspond to the key and the attribute relationship correspondences. The force-directed model is one whereby edges are represented as springs with attractive (stretch) and repulsive (compressive) forces. These serve to provide ad hoc adjustment of distances and generate a visual arrangement of the enumerated data elements as the vertices with the edges relating shared attributes. The data seen in FIG. 9 are notional but they represent a trend, the same trend seen in the scatter plot of FIG. 3. Recall in FIG. 3 that there are three variable A, B, and C. The present example only refers to Variable A of the three, but the others are handled the same way. The multiple different colors of edges distinguish which attributes constitute the closest relationships between the two data elements. The difference in thickness indicates a quantitative difference in granularity of attribute, with the thicker constituting a smaller unit-value difference and the thinner representing a greater attribute value difference. FIG. 9 benefits from a sparse graph where the addition of edges was stopped at the point it is fully connected.

The present invention contemplates using multiple springs or varied spring constants to adjust for different edge relationship lengths as determined by the scale-based method. This could achieve the desired distance metrics. This was not done inherently by the software, but there are multiple strategies for accomplishing this including modification of the adjacency matrices and software modifications.

EXAMPLE #2

Computational Data Analytics

This example describes how computation can be applied to analyze data and develop a sub-graph from the data. In this case rules are applied to establish what sub-graphs or subsets of data within the larger network of interrelated data satisfy a defined criterion: in the example, determining subsets that sum to a given target value. The significance of this method is that the totality of the data is used and generates a complete, brute force solution without the exponential growth of current state of the art. This solution has been developed into a C++ algorithm for which pseudocode has been created to explicitly lay out the approach and for which data have been generated to demonstrate sub-exponential growth.

A proof-of-concept prototype was created to demonstrate a method of generating complete solutions for a version of the well-known Subset Sum Problem (SSP) with significantly lower run time complexity than the state of the art. Generally, the SSP problem is: given a set of integers, is there a non-empty subset whose sum is zero? For example, given the set {−7, −3, −2, 5, 8}, the answer is yes because the subset {−3, −2, 5} sums to zero. This particular SSP requires the determination of all subsets S' of a set of integers S that sum to a target value t. All solutions to the SSP can be placed in the following notation:

$$\Sigma \epsilon_i a_i = t$$

where $a_i$ is the set of S integers, and t is a target integer value. The equation is a special case of the more general class of knapsack problems detailed by Martello, S. and P. Toth, *Knapsack Problems: Algorithms and Computer Implementation*, John Wiley and Sons (1990). For the SSP the factor $\epsilon_i$ is either zero or one. The SSP is one of many equivalent combinatorial optimization problems of importance to the field of computation and data analysis. The SSP is one of the recognized Non-deterministic Polynomial-time Complete (NPC) problems for which solutions are achievable at small values of S, but the computational requirements compound quickly with increasing set size. In the case of the SSP, the simplest brute force algorithm requires on the order of $N2^N$ combinations to arrive at a complete solution. Various heuristic-based algorithms have improved on this naive approach. Two well-known approaches, used alone or in combination, are the branch and bound method and dynamic programming. See, Martello, S. and C. Minoux, *Surveys in Combinatorial Optimization*, North Holland Mathematical Studies, Elsevier Press, ISBN 0080872433 (2011). These methods expand the size of S that can be feasibly solved, but the algorithm run time still grows at some exponential value of the input size. The exponential increase in computational burden with set size S has been a feature of the NPC class of problems, and approximate solutions often provide the only practical ways of solving these problems. Approximate solutions approach the optimal solution. These approximate solutions are typically statistical, and they can be nearly as computationally expensive as the exact solutions because they retain an exponential increase with input size. For example a method has produced an algorithm that produces approximated results with steps proportional to $2^{(N/4)}$. See, Nick Howgrave-Graham and Antoine Joux, *New Generic Algorithms For Hard Knapsacks*, In Eurocrypt 2010, pages 235-256 (2010).

Finding an exact solution to an NPC problem while avoiding the exponential run-time growth has been a longstanding mathematical issue. The prototype algorithm was developed within Microsoft® Excel®, and the spreadsheet-based prototype was created for a small SSP to promote ease of description while simultaneously showing that it produces correct results with the desired growth characteristics. The conceptual implementation is presented below using pseudocode.

An analysis of the run time growth is presented based on increasing set sizes to demonstrate the method's constrained growth.

Software Coding Implementation of Example 2

Figure 10:
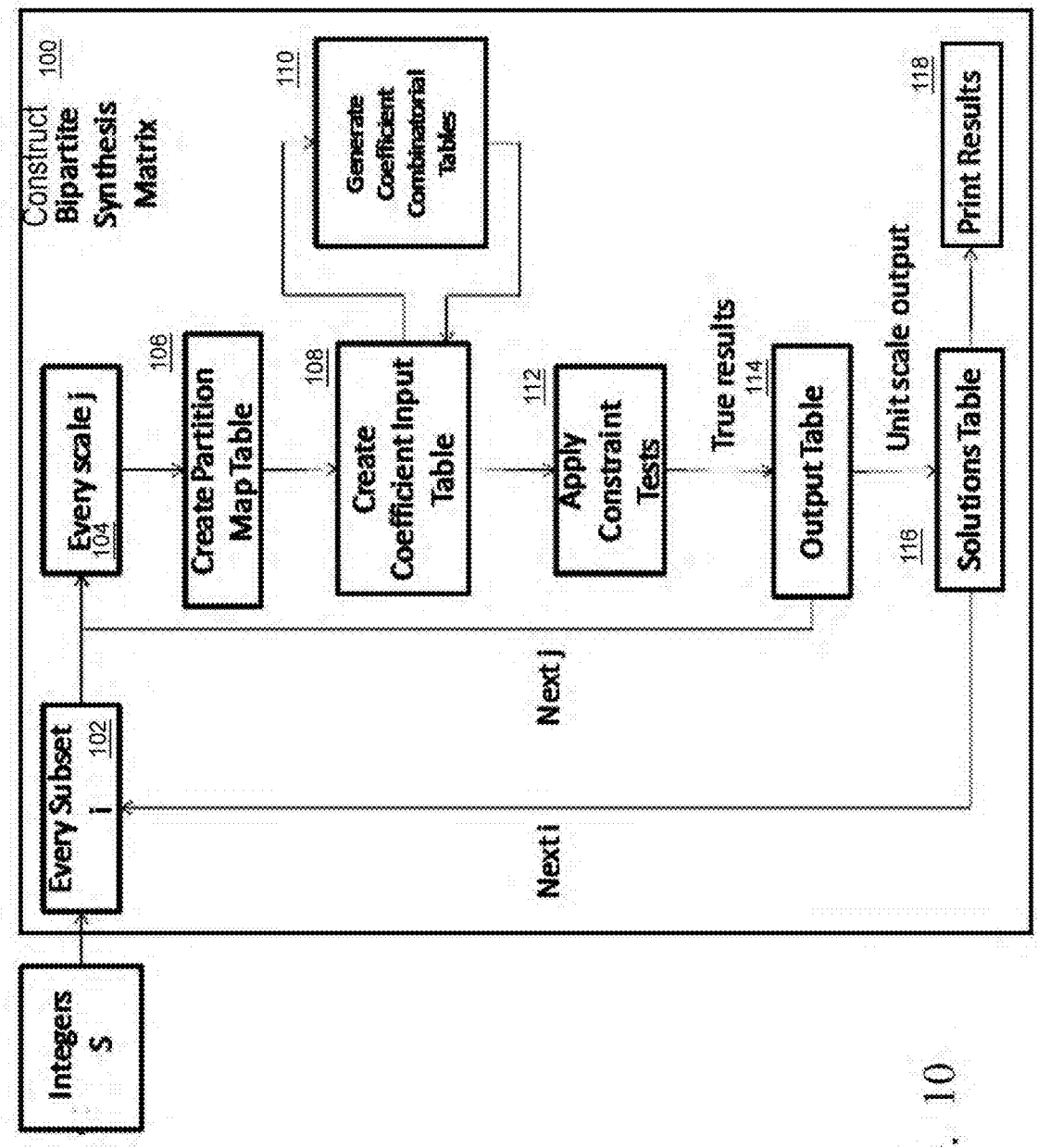
FIG. 10 is a more detailed software process flow diagram of the process of FIG. 1.

A process flow diagram of the multi-scale implementation of the three constraints is depicted in FIG. 10. Two primary loops are needed, one 102 to evaluate every subset, i, and one 104 to apply the multi-scale process involving repeatedly halving the value of partition range, j. At step 106 a partition mapping table is created. The partition mapping table defines positions of partitions within the BSM, and the number of mappings can be determined based on the scale R and the maximum extent of the BSM. A coefficient input table is created at step 108, and this contains initial coefficients each of which are used to generate a coefficient combinatorial table at step 110. A coefficient input is of size related to the number of partitions, and from that initial group any and all coefficient combinations are generated and placed in the coefficient combinatorial table 110. The coefficient combinations from coefficient combinatorial table 110 are tested by constraint tests at step 112. The check constraint test 112 is a generic constraint test that requires the value of each coefficient combinations from coefficient combinatorial table 110 to satisfy a Boolean (truth-value) expression. The successful coefficient-partition pairings from step 112 are transferred to an output table at step 114. For subsequent iterations the output table 114 is the basis for each new coefficient input table 108. The process ends for every subset value when the unit scale is reached, after which the output table 114 is sent to a solutions table 116.

Exemplary source code reflecting the process outlined in FIG. 10, and applied to the Computational Example #2, is described below. Generally, the source code initializes the parameters of the SSP and enables interact with the BSM which the source code populates. The source code calls subroutines within two primary loops (FIG. 10, 102, 104) accounting for different subset sizes and different interval values. For convenience, the interval is some value of $2^n$ greater than the largest integer of the set S. This achieves a granularity of one by the repeated halving. The source code uses a number of arrays that are equivalent to tables used in the spreadsheet prototype.

The partition maps are references to describe the extent of a partition interval mapping to the BSM horizontally. There is at least one partition. Each partition has the same length S of the BSM. Each partition is bounded by a leftmost cell (minimum of range) and a rightmost boundary (maximum of range). These cells are defined by the Min_of_Range cell and offsets determined by the value of range j establish successive Min_of_Range and Max_of_Range mappings. The partition information is stored in arrays for each scale level j. There is one mapping group for each scale j, and the number of partitions mapped are determined by j for a given range of integer values.

Every partition must have at least one coefficient mating. Except for the first level, the coefficients associated with the partitions must be developed by generating various combinations. When initialized and j equals the full Interval of data, the single coefficient is subset i and mated with the single partition. This is the only table and only combination to test. For subsequent levels, there may be more coefficient input tables 108 corresponding to the number of output results from the previous level. The input coefficient arrays are used to generate coefficient tables 108, which are consolidated for testing at step 112. The initial coefficient is stored in the coefficient input table 108. Subsequent values of j produce additional partitions. Additional columns must be added to the coefficient input table 108 to accommodate the additional partition-coefficient pairings.

The coefficient input table 108 is the basis for creating the various coefficient combinations. For iterations of j, the conversion of a coefficient output table into a coefficient input table 108 involves transferring the parent coefficient to one of the two child partitions. The other child partition receives a default coefficient value of zero.

```
Begin Program
\\
Declare Set_Size as integers \\describing the set size containing integers within 1 to Max_of_Range
Declare t as integer \\describing the target value of the problem
Declare BSM as bipartite matrix of Set_Size \\ BSM is a matrix Set_Size × (max_of_Range:Min_of_range)
Declare Min_of_Range, Max_of_Range as integers
Min_of_Range = 1
Max_of_Range = next higher value of 2ⁿ that is > maximum value of S
For i = 1 to Set_Size Step +1
    Number_of_solutions = 0 \\initialize variable specifying row of Solutions Table
    For j = max_of_range to min_of_Range   Step down by halving j
        Number_of_Outputs_j = 0 \\initializing variable associated with Output_Table row
        Run Partition_Map subroutine to define partitions with BSM for scale j
        Run Coefficient_Table_Creation subroutine \\make consolidated coefficient table
        Run Constraint_Testing subroutine \\ if all are true send coefficients to output table
        If j = min_of_range
            Run Output_to_ Solutions_Table subroutine
        End if
        Next j
    End for
    Next i
End For
Run Deliver_Solutions
End program
```

```
Begin Coefficient_Table_Creation
\\Inputs Number_of_Outputs_Previous_j, array Output[j,L,M] \\ from previous j iteration
Declare integers M, Previous_Level _j , Coefficient_Tables, Rows_of_Input_Coefficient_Table,
Coefficient_Table_Development_j
Declare array Input_Coefficient[j, L, M] \\output of subroutine
\\
If Number_of_Partitions_j = 1 then              \\Variable from Partition_Map subroutine
     Input_Coefficient [j, 1, 1] = i        \\ i is equal to the subset size S'
     Coefficient_Tables= 1
     Coefficient_Table_Development_j = 'Complete' \\for this scale level j
Else
     Coefficient_Table_Development_j = 'Not Complete'
     \\Below creates new set of coefficients from previous output table with expanded numbers of
     \\coefficients to take into account increase in numbers of partitions at new j.
     Rows_of_Input_Coefficient_Table = Number_of_Outputs_Previous_j
     For L = 1 to Length_of_Input_Coefficient_Table step +1    \\Count from previous Output Table
          For M = 1 to Number_of_Partitions_j step +1
               If M is odd \\default coefficient is set to previous parent coefficient
                    Previous_Level _j = j*2   \\used to reference the previous iteration of j
                    output table
                    Previous_Partition= M- (M-1)/2
                    Input_Coefficient [j, L, M] = Output[Previous_Level, L,
                    Previous_Partition]
               Else \\M is even and default coefficient is initialized to zero
                    Input_Coefficient [j, L, M]= 0
               End if
               Next M
          End for
          Next L
     End for
     Run Expand_Coefficient_Tables
End Coefficient_Table_Creation
```

The generated coefficient combinatorial table 110 contains all possible arrangements of coefficients based on each set of coefficients from the coefficient input table 108. The coefficient combinatorial table 110 is the prospective list of all combinations to be evaluated by the constraint testing stage. It is lengthy to incorporate particular rules for the first row of each coefficient array as well as the first partition and the partition pairings.

```
Begin Expand_Coefficient_Tables
\\Inputs: Input_coefficient[j,L,p], Coefficient_Table_Development_j
Declare integers Coefficient_Table_Row , p, Previous_row, Sum, Test, Test_done, Prev_partition,
Coefficient_Table
Declare p_odd, previous_odd_p
Declare array Coefficient[j,q,Coefficient_Table_Row,p] \\output of subroutine
For q = 1 to Rows_of_Input_Coefficient_Table \\One table for every row of Input Table
     Coefficient_Table_Row = 0
     Repeat until Coefficient_Table_Development_j = 'complete'
          Coefficient_Table_Row = Coefficient_Table_Row +1
          If Coefficient_Table_Row =1 Then
               Reset p = 1
               For p = 1 to Number_of_Partitions_j do step +1
                    Coefficient[j,q, Coefficient_Table_Row ,p] = Input_Coefficient[j,q,p]
                    Next p
               End For
          Else \\ Coefficient_Table_Row is not first row of coefficient table q
               \\Check to see if coefficient table q is completed
               Previous_row = Coefficient_Table_Row - 1
               Sum = 0 \\initialize variable
               For p_odd = 1 to Number_of_Partitions Step +2
                    Sum_odd_partitions = Sum_odd_partitions +
                    Coefficient[j,q,previous_row,p_odd]
                    Next p_odd
               End For
               If Sum_odd_partitions = 0
                    Coefficient_Table_Development_j = 'complete'
               End if
               Reset p = 1
               For p = 1 to Number_of_Partitions do Step +1
                    If p = 1 do
                         If Coefficient[j,q,Previous_row,1] = 0
                              Coefficient[j,q, Coefficient_Table_Row ,p] =
                              Coefficient[j,q,1,1]
                         Else
                              Coefficient[j,q, Coefficient_Table_Row ,p] =
                              Coefficient[j,q,previous_row,p] - 1
                         End if
                    End if
```

```
\\ get all subsequent odd partitions after p=1
If p <>1 and p is odd then
    Previous_odd_p = p-2
    Test = 1 \\Initialize var
    For Partition = 1 to Previous_odd_p step +2
        If Coefficient[j,q, Coefficient_Table_Row ,Partition] =
        Coefficient[j,q,1,Partition]
            Test= 2 + Test
        Else
            Test=0
        End if
        If Test = Previous_odd_p is true then
            If coefficient [j,q,Previous_row,p] = 0
                Coefficient[j,q, Coefficient_Table_Row,
                p] = coefficient[j,q,1,p]
            Else
                Coefficient[j,q, Coefficient_Table_Row,
                p] = Coefficient[j,q,previous_row,p]-1
            End if
        Else
            Coefficient[j,q, Coefficient_Table_Row
            ,p]=coefficient[j,q,previous_row,p]
        End if //Test
        Next Partition
    End for
End if \\odd p
If p is even
    Prev_partition = p-1
    Coefficient[j,q,Coefficient_Table_Row,p]=coefficient[j,q,1,
    Prev_partition] -coefficient[j,q, Coefficient_Table_Row ,
    Prev_partition]
End if
Next p
        End For
    End if
End Repeat
Coefficient_Table_Length[q] = Coefficient_Table_Row
Next q
End for
End Coefficient_Table_Development
```

The three constraint tests 112 are applied for each coefficient set (row) in the consolidated coefficient tables. One coefficient is matched to each partition for a series of three tests. Those partition-coefficient combinations that evaluate to "true" for all three tests are sent to the coefficient output table 114. All others are discarded.

```
Begin Constraint_Testing
\\Testing of constraints
\\Inputs Coefficient[j,L,n,p], Partition_min[j,p], Partition_max[j,p], Number_of_partitions_j
Declare as integers: n,p,L, Pop_Test, Min_Test, Max_Test, Number_of_Outputs_j
Declare arrays Output_table[j, Number_of_Outputs_j,u]
For L = 1 to Coefficient_Table_Length[q]
    For n=1 to Coefficient_Table_Row Step +1
        Min_Test = 0
        Max_Test = 0
        Pop_Test = "True"
        For p = 1 to Number_of_partitions step+1
            Population = Count integers occurring in the BSM within range
            Partition_min[j,p]:Partition_max[j,p]
            If Population < Coefficient[j,L,n,p]
                Pop_Test =" False"
            End if
            Min_Test = Min_Test + Coefficient[j,L,n,p]*Partition_min[j,p]
            Max_Test = Max_Test + Coefficient[j,L,n,p]*Partition_max[j,p]
        Next p
    End For
    If the following are true
        Min_Test <= t, and
        Max_Test >= t, and
        Pop_Test = "True"
    Then
        Number_of_Outputs_j = Number_of_Outputs_j + 1
        For p = 1 to Number_of_Partitions Step +1
            Output_table[j, Number_of_Outputs_j,p] = Coefficient[j,L,n,p]
        Next p
    End for
    \\Else nothing as the coefficient set tested fails and is discarded
```

-continued

```
        End if
      Next n
    End for
  Next L
End for
End Constraint_Testing
```

Based on the constraint tests 112, any coefficient array the meets the conditions is transferred to the output table 114. The number of outputs is quantified.

```
Begin Output_to_ Solutions_Table
Declare variable s
  For s = 1 to Number_of_Outputs_j Step +1 \\potential
  for multiple solutions
    For p = 1 to Number_of_Partitions Step +1
      Solutions[s,p] =Output[j,s,p]
      Next p
    End for
    Number_of_solutions = Number_of_solutions + 1
  Next s
End for
End Output_to_Solutions_Table
```

The solutions table 116 receives the coefficients for every subset i. The results can be formatted in which they are mated to the unit integer mappings for evaluation. The results will contain all solutions.

```
Begin Deliver_Solutions
Declare integer v
  For v = 1 to Number_of_solutions Step +1
    For p = 1 to Max_of_Range step +1
      Print Solutions[v,p]
      Next p
    End For
  Next v
End for
End Deliver_ Solutions
```

Figure 11:
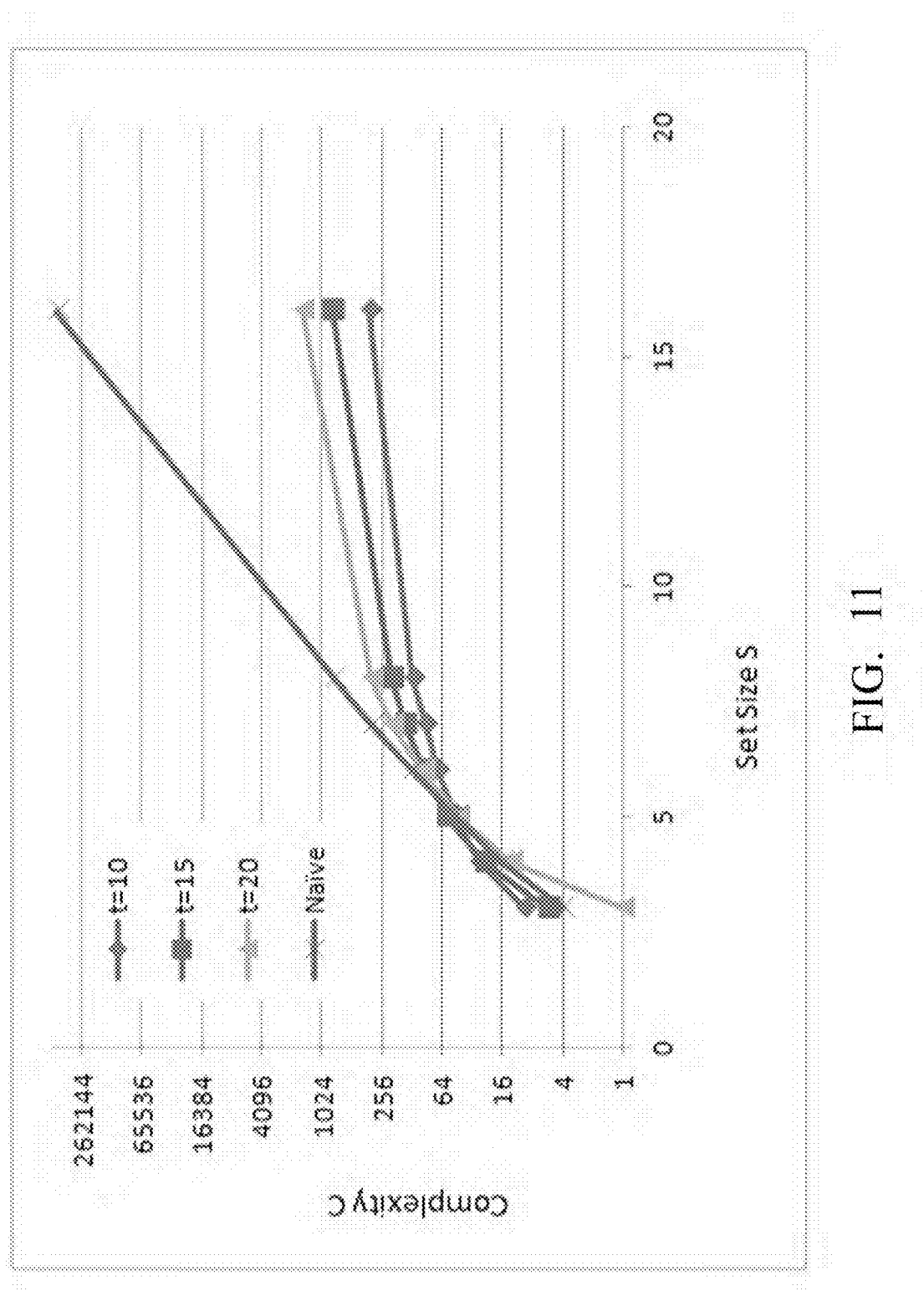
FIG. 11 is a graph illustrating how the rate of increase of the present method decays substantially as data set size increases.

FIG. 11 is a graph illustrating that the processing time for the kind of applications envisioned can be managed so that the computational burden does not overwhelm computer resources. The data are extracted from the subset sum solver application of Example 2. It shows an estimate of run-time complexity versus set size of a group of numbers. The Complexity is calculated by counting the size of the coefficient tables that constitute the combinatorial portion of the algorithm. This is a proxy for the length of the evaluative process for filtering all of the links during the one-mode conversion from bipartite matrix to ordinary adjacency matrix. It is demonstrative that the number of relationships developed through the process can be managed as the data set increases in size. The graph depicts how the rate of increase in computational complexity of the present method decays substantially as data set size increases, which is distinguished from the linear trend of the naive approach of conventional brute force algorithms (expansion proportional to $n2^n$). Because the graph is presented in a logarithmic scale for Complexity C, the expansion of the naive conventional algorithm is exponential and the new BSM algorithm expands at some rate below an exponential increase. It can be seen that in a software context the present method reduces program size and/or run time.

EXAMPLE #3

Stochastic Processes

There exist several broad processes that can be enabled by the present invention which fall into the category of stochastic-related processes. The first is prediction and interpolation, and a spreadsheet-based prototype may be implemented using Microsoft® Excel® that could also be rendered into an algorithm similar to that described in Example 2. The processes for prediction versus interpolation are identical because prediction is just a time-dependent multivariate problem whereas interpolation is a broader generalization of relating data with unknown variables to data with known variables by distance.

A second technique is one related to generating random numbers. A third, also reduced to practice via spreadsheet is a so-called Monte Carlo acceleration, which applies random processes to evaluate complex probabilistic tasks.

In all such cases the data sets are placed in a Bipartite Synthesis Matrix that is intended to undergo the coarse to fine granularization process. There exist multiple attributes to each datum. A new datum that is missing one or more attributes is appended to the data set. This is called the datum of interest. It is desired to predict the range of value(s) for the missing attribute(s). The process starts at a coarse level. The data are evaluated for the attributes that are shared among the data including the datum of interest but not the missing attributes of the datum of interest. The data that share the attributes are retained and the other data are excluded as too remote, irrelevant, or uncertain to be contributory to the analysis. The process is repeated for finer granulations. Once an attribute range fails to contain correspondence with the datum of interest and at least one other datum, the granularization process for that attribute is terminated, and the parent attribute where correspondence exists is accepted. The process continues until all attributes are terminated either because they become empty or because the finest granularity is reached. It could be that multiple data correspondences exist in the aforementioned parent attribute, whereby a probabilistic condition exists.

A stochastic process for generating random numbers involves generating binary data using a conventional pseudo-random number generator (PRNG), also known as a deterministic random bit generator (DRBG), for generating a sequence of numbers from a seed value. These pseudo-random binary numbers are applied determine which of a pair of partitions is selected over a large range of values. This is the coarsest stage. The partition selected is in turn halved to create two new child partitions and the other coarse partition discarded. The process of pseudo-randomly selecting one of two partitions is repeated until a unit scale partition is selected and this partition has a numerical value attribute. The attribute number value is captured as a random sequence, and the whole process is repeated to generate a new number, which is of variable length and is appended to the first. Through n processes, a number range of $2^n$ can be achieved. Because the scale is exponential, the process can quickly scale to large values and lengths of numbers. Each resulting number is appended to generate a long series of numerical digits (binary, base-ten etc.) in a string that may serve as a one-time pad for use in encryption or for use as a random variable for other applications. Because the numbers are strung together and are of variable length and long repeat time, the knowledge of the seed and the algorithm are insufficient to decrypt a message encrypted by a one-time pad generated by this system. Alternatively, the compromise of a one-time pad would also compromise the message encrypted by the pad, but the loss would not alone compromise the entire system (provided other reasonable security safeguards are in place). This has been validated by a chi square test which indicated suitable randomness. The use of the multi-scale process reduces the threat of the pseudo-random number looping because of a poorly chosen seed value for the algorithm.

The accelerated Monte Carlo process was reduced to practice by solving the so-called Birthday problem. The example process generated 30 random numbers from 1-365 to determine the probability of any two people sharing a birthday. The random numbers are placed in a Bipartite Synthesis Matrix.

Figure 12:
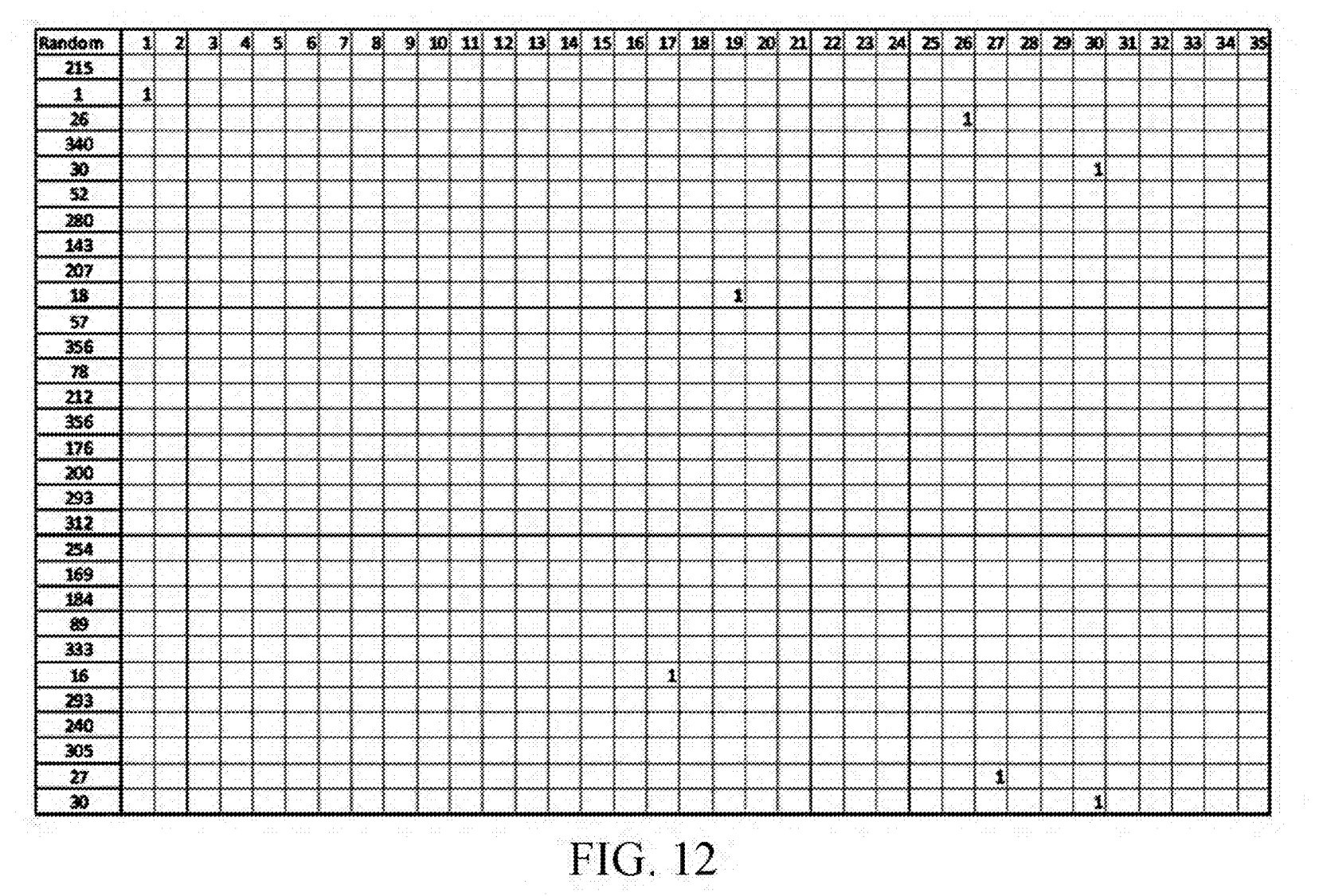

FIG. 12 is a portion of the BSM for the Stochastic Birthday problem (the date attribute columns extend to the right from 1 to 365 but full extent is not shown). This BSM is stored in the spreadsheet as Scale=1 but other scales are determined simply by aggregating columns computationally. The days are simply listed as 1-365 but they could easily be broken into day, week, and month sub-divisions. The random numbers generated on the right are repeatedly revised to generate new instances and achieve the Monte Carlo acceleration. At the coarsest level (scale=365), all data are correspondences with each other.

FIG. 13 shows correspondences generated at different scales for the 30 random birth dates. The scales were adjusted to achieve a series of scale reductions (coarse descending to more granular) that were modified from the standard halving process because 365 is not of the a value related to 2j. The numbers across the top are the date attributes from the BSM but only the 1-35 day portion of the larger 365-day range. The numbers within this matrix (in this case variously 0-14) represent correspondence populations in each partition at a given scale. The different partitions are not explicitly shown but it should be evident that the lowest scale tallies correspondences in each single column cell for unit-size partitions. Likewise, the scale 2 row above the unit scale evaluates for correspondences within coarser, 2-day partitions. For each partition the population of correspondences is calculated at the cell corresponding with the first day of the partition. At the most coarse, 183-day scale, the partition covering 1-183 has 14 correspondences. Correspondences exist if there is a one or greater. Only if there is a value greater than 1 is there a "shared correspondence" indicative at scale 1 of two people sharing a birthday. At scale 2, of course, there is a shared correspondence when two people share a 2-day birthday window, etc.

FIG. 14 is a Degree Connectivity Table which calculates the numbers of correspondences that exist per date partition at different partition scales. At each scale from the previous table the number of correspondences are tallied. In this case the row across the top are not day attributes but instead it is the degree level of correspondences that occur at a given scale. For instance, the number of single correspondences that are present among all of the partitions (no shared correspondence) are calculated in column 1. Shared correspondences in which 2 individuals co-occur within a partition are listed in column 2. Likewise, shared correspondences in which 3 individuals share a partition are listed in column 3 and so forth. For instance, at scale 1 there are 26 instances of the 30 people who have unique birthdays and two instances of two people sharing birthdays. At scale 2 there are 24 people with unique 2-day birthday windows and 2 pairs of individuals with birthdays within a common 2-day window. At the coarsest scale there is a group of 12 who share one window and a group of 18 who share the other of the two window/partitions.

FIG. 15 illustrates the stochastic calculations. At each scale the same basic calculation can be devised to converge on a Monte Carlo accelerated solution. In the case of Scale 2 the number of shared correspondences of three or more individuals sharing a 2-day window are determined. If there is any, then the probability of a shared birthday is 100% certain. As in the example diagram previous, there is no instance of this, then the simple probability determination is calculated: P=(1−0.5^Number of 2-person shared correspondences). This calculation is performed in the cell to the right of "Scale 2 probability". The cells below this are statistical measurements of which the average is used to evaluate the Monte Carlo probability of co-occurrence as repeated runs are used to converge to a solution. At more granular levels, the density of correspondences is reduced for the partitions and some partitions will contain no correspondences. Although the presence of correspondences are coarser than unit scale do not guarantee that a correspondence exists at the finer scale, a probabilistic calculation can be made based on the number of correspondences shared in a given attribute and the number of attributes that have these correspondences. This probabilistic estimate can be used with repeated trials of random numbers just like a traditional Monte Carlo scenario.

The above-referenced accelerated Monte Carlo need only be applied at a scale different than the most granular scale. If for instance the scale of value two is applied, there are different occupancy scenarios. If at scale two, there is zero or one occupancy, then the likelihood of a correspondence at scale one is nil. If there is three or greater, then the likelihood is total. If the occupancy is two, the likelihood is probabilistic based on three possible states at scale one, two of the three that would contain correspondences. Because this is an increase in information that is not captured by the traditional Monte Carlo method, this can achieve faster convergence to the solution and could be useful for various applications where sparse data is involved. Those skilled in the art will understand that various modifications and variations can be made in the present invention without departing from the spirit or scope of the invention. It is to be understood, therefore, that the invention may be practiced otherwise than as specifically set forth in the appended claims.

What is claimed is:

1. A method of analyzing data by use of a programmable controller including software comprising computer instructions stored on non-transitory computer media for performing the steps of:
   inputting a data set comprising a series of data objects each of which depend on at least one variable;
   creating a bipartite data synthesis matrix comprising a table with at least one row corresponding to said at least one variable, and columns defined by a plurality of partitions fitting within an interval according to an adjustable scale;
   populating said bipartite data synthesis matrix with said data set;
   incrementally changing the adjustable scale of the columns of said bipartite data synthesis matrix to achieve aggregation of said data within the bipartite matrix, thereby establishing both absolute and relative proximity of data objects within a framework of said the adjustable scale and progressively aggregating or disaggregating data correspondences;

applying a filter to selectively identify a significant subset of said data correspondences; populating a plurality of adjacency matrices, each said adjacency matrix being populated from said bipartite data synthesis matrix with data objects having significant data correspondences at each of said incremental scales.

2. The method of analyzing data according to claim 1, further comprising a step of rendering each of said plurality of adjacency matrices as an ordinary adjacency graph.

3. The method of analyzing data according to claim 1, further comprising a step of rendering each of said plurality of adjacency matrices as a data array.

4. The method of analyzing data according to claim 1, wherein said series of data objects are multivariate.

5. The method of analyzing data according to claim 1, wherein said series of data objects are single-variable.

6. The method of analyzing data according to claim 2, wherein said step of rendering each of said plurality of adjacency matrices as an ordinary adjacency graph further comprises rendering each of said plurality of adjacency matrices as a visualizable multivariate graph.

7. The method of analyzing data according to claim 1, further comprising repeating said step of incrementally changing the adjustable scale of the columns of said bipartite data synthesis matrix to revise significant data correspondences.

8. The method of analyzing data according to claim 1, wherein said step of populating a plurality of adjacency matrices comprises populating adjacency matrices having nodes, and proportionate distance metrics between nodes based on said scale.

9. The method of analyzing data according to claim 1, further comprising a step of rendering each of said plurality of adjacency matrices as a two dimensional graph or matrix regardless of number of variables.

10. The method of analyzing data according to claim 1, further comprising a step of rendering each of said plurality of adjacency matrices as a three dimensional graph or matrix regardless of number of variables.

11. A computerized method of analyzing data by use of a programmable controller including software comprising computer instructions stored on non-transitory computer media for performing the steps of:

inputting a multivariate data set comprising a series of data objects each of which depend on a plurality of variables;

populating a bipartite data synthesis matrix with said multivariate data set, said bipartite data synthesis matrix comprising a table with rows of said variables and columns defined by a plurality of partitions fitting within an interval having an adjustable scale;

incrementally changing the adjustable scale of the columns of said bipartite data synthesis matrix to achieve aggregation of said data within the bipartite matrix, thereby aggregating or disaggregating correspondences;

populating a plurality of adjacency matrices, each said adjacency matrix being populated from said bipartite data synthesis matrix with said data objects at each of said incremental scales; rendering each of said plurality of adjacency matrices as an ordinary adjacency graph.

12. The computerized method of analyzing data according to claim 11, wherein said step of rendering each of said plurality of adjacency matrices as an ordinary adjacency graph further comprises rendering each of said plurality of adjacency matrices as a visualizable multivariate graph.

13. The computerized method of analyzing data according to claim 11, further comprising a step of rendering each of said plurality of adjacency matrices as an ordinary adjacency graph.

14. The computerized method of analyzing data according to claim 11, further comprising a step of rendering each of said plurality of adjacency matrices as a data array.

15. The computerized method of analyzing data according to claim 11, wherein said series of data objects are multivariate.

16. The computerized method of analyzing data according to claim 11, wherein said series of data objects are single-variable.

17. The computerized method of analyzing data according to claim 11, wherein said step of rendering each of said plurality of adjacency matrices as an ordinary adjacency graph further comprises rendering each of said plurality of adjacency matrices as a visualizable multivariate graph.

18. The computerized method of analyzing data according to claim 11, further comprising repeating said step of incrementally changing the adjustable scale of the columns of said bipartite data synthesis matrix to revise significant data correspondences.

19. The computerized method of analyzing data according to claim 11, wherein said step of populating a plurality of adjacency matrices comprises populating adjacency matrices having nodes, and proportionate distance metrics between nodes based on said scale.

20. The computerized method of analyzing data according to claim 11, further comprising a step of rendering each of said plurality of adjacency matrices as a two dimensional graph or matrix regardless of number of variables.

21. The computerized method of analyzing data according to claim 11, further comprising a step of rendering each of said plurality of adjacency matrices as a three dimensional graph or matrix regardless of number of variables.

* * * * *